(12) United States Patent
Okubo et al.

(10) Patent No.: US 9,933,695 B2
(45) Date of Patent: Apr. 3, 2018

(54) POSITION DETECTION DEVICE, OPTICAL DEVICE, LIGHT SOURCE DEVICE, AND PROJECTOR

(71) Applicant: Seiko Epson Corporation, Tokyo (JP)

(72) Inventors: Hirofumi Okubo, Matsumoto (JP); Kazunori Maeta, Matsumoto (JP); Akira Nemura, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/407,608

(22) Filed: Jan. 17, 2017

(65) Prior Publication Data

US 2017/0205699 A1    Jul. 20, 2017

(30) Foreign Application Priority Data

Jan. 19, 2016 (JP) ................. 2016-007666
Jan. 19, 2016 (JP) ................. 2016-007667

(51) Int. Cl.

| | |
|---|---|
| G03B 21/14 | (2006.01) |
| G01B 11/00 | (2006.01) |
| G03B 21/20 | (2006.01) |
| G02B 26/06 | (2006.01) |
| H04N 9/31 | (2006.01) |
| G01B 11/26 | (2006.01) |
| G01B 11/27 | (2006.01) |
| G02B 7/00 | (2006.01) |
| G02B 27/28 | (2006.01) |

(52) U.S. Cl.
CPC .......... *G03B 21/2073* (2013.01); *G01B 11/26* (2013.01); *G01B 11/272* (2013.01); *G02B 7/00* (2013.01); *G02B 26/06* (2013.01); *G02B 27/283* (2013.01); *G03B 21/204* (2013.01); *H04N 9/3105* (2013.01); *H04N 9/3158* (2013.01); *H04N 9/3167* (2013.01); *H04N 9/3194* (2013.01); *G03B 2205/0053* (2013.01)

(58) Field of Classification Search
CPC .... G03B 21/14; G03B 21/204; G03B 21/142; G03B 21/2073; G01B 11/00; G01B 11/272
See application file for complete search history.

(56) References Cited

U.S. PATENT DOCUMENTS

| | | | | |
|---|---|---|---|---|
| 9,235,059 | B2* | 1/2016 | Nomura | G02B 27/281 |
| 9,733,552 | B2* | 8/2017 | Otsuki | G03B 17/14 |
| 2009/0001918 | A1* | 1/2009 | Lin | G01B 7/30 |
| | | | | 318/503 |
| 2012/0140183 | A1 | 6/2012 | Tanaka et al. | |
| 2017/0167891 | A1* | 6/2017 | Maeda | G01D 5/344 |

FOREIGN PATENT DOCUMENTS

JP    2012-137744 A    7/2012

\* cited by examiner

*Primary Examiner* — William C Dowling
(74) *Attorney, Agent, or Firm* — ALG Intellectual Property, LLC

(57) ABSTRACT

A position detection device includes: a sensor that includes a light emission unit and a light reception unit receiving light emitted from the light emission unit; a driving unit; a gear (transmission gear) that is disposed at a position facing the sensor and is rotated by power from the driving unit; and a control unit that drives the driving unit based on an amount of light received by the light reception unit and detected by the sensor.

8 Claims, 12 Drawing Sheets

POSITION DETECTION DEVICE, OPTICAL DEVICE, LIGHT SOURCE DEVICE, AND PROJECTOR

CROSS REFERENCE TO RELATED APPLICATION

The entire disclosure of Japanese Patent Application No. 2016-07666, filed Jan. 19, 2016 and No. 2016-07667, filed Jan. 19, 2016 is expressly incorporated by reference herein.

BACKGROUND

1. Technical Field

The present invention relates to a position detection device, an optical device, a light source device, and a projector.

2. Related Art

In the related art, there are known light source devices that convert wavelengths of excited light emitted from solid-state light sources and emit the light as fluorescent light (for example, see JP-A-2012-137744).

A light source device disclosed in JP-A-2012-137744 includes a solid-state light source, a condensing lens, a plurality of lenses, a diffusion plate, and a phase difference plate (½ wavelength plate). Light emitted from the solid-state light source is incident on the phase difference plate via the condensing lens, the plurality of lenses, and the diffusion plate. The phase difference plate has a function of converting a polarization direction of incident linearly polarized light and is disposed in the light source device, for example, to be able to adjust rotation so that an S-polarized component of the light emitted from the phase difference plate is in the range of 10% to 30% and a P-polarized component is in the range of 90% to 70%.

Incidentally, the light source device disclosed in JP-A-2012-137744 includes an optical device that holds the phase difference plate described above to be able to adjust rotation. As such an optical device, for example, an optical device that includes a holder holding the phase difference plate and a gear transmitting power of a motor or the like to the holder is considered.

However, when the optical device including the gear is disposed in the light source device, dust such as grease attached to the gear or the like is considered to be attached to the phase difference plate (the optical element). Thus, there is a problem that the function of converting the polarization direction of the incident light deteriorates due to attachment of the dust to the phase difference plate.

In the optical device, a position detection device such as a photosensor accurately detecting a rotation amount of the gear is considered to be installed to change a rotation angle of the phase difference plate according to rotation amount of the gear. Such a position detection device includes, for example, a light emission unit and a light reception unit. A light-shielding portion moved according to a rotation amount of the gear is installed between the light emission unit and the light reception unit. By determining whether a light reception amount of light emitted from the light emission unit by the light-shielding portion in the light reception unit exceeds a predetermined threshold, a position of the gear is detected by the position detection device.

In the position detection device, however, the position of the gear is detected by determining whether the amount of received light in the light reception unit exceeds the predetermined threshold set in advance. Therefore, in a case in which the light emission unit and the light reception unit degrade, the light reception amount of light incident on the light reception unit does not exceed the predetermined threshold despite the fact that appropriately all of the light emitted from the light emission unit is incident on the light reception unit. In this case, there is a problem that the position of the gear or the like may be not accurately detected by the position detection device.

SUMMARY

An advantage of some aspects of the invention is to provide a position detection device, an optical device, a light source device, and a projector capable of contributing to dust resistance or accurately detecting the position of a gear or the like.

A position detection device according to a first aspect of the invention includes: a sensor that includes a light emission unit and a light reception unit receiving light emitted from the light emission unit; a driving unit; a gear that is disposed at a position facing the sensor and is rotated by power from the driving unit; and a control unit that drives the driving unit based on an amount of light received by the light reception unit and detected by the sensor. The gear includes an incidence suppression portion suppressing incidence of at least apart of the light emitted from the light emission unit on the light reception unit according to rotation of the gear. The control unit includes a threshold setting unit that sets a detection threshold of the light in the light reception unit to a predetermined value which is less than a value of a first light reception amount at the time of incidence of appropriately all the light on the light reception unit and is greater than a value of a second light reception amount at the time of suppressing of appropriately all the light by the incidence suppression portion, and a position detection unit that detects a position of the gear after the threshold setting unit sets the detection threshold.

An origin position detection unit detecting an origin position of the gear can be exemplified as the position detection unit.

According to the first aspect, the threshold setting unit sets the detection threshold to the value which is less than the first light reception amount received by the light reception unit and is greater than the second light reception amount. For example, compared to a position detection device in which the detection threshold is set in advance, the appropriate detection threshold can be set even in a case in which at least one of the light emission unit and the light reception unit degrades. Accordingly, it is possible to accurately detect the position (origin position) of the gear or the like.

In the first aspect, it is preferable that the threshold setting unit sets the detection threshold to a value of ½ of a value obtained by subtracting the second light reception amount from the first light reception amount.

According to the first aspect with this configuration, since the value of ½ of the value obtained by subtracting the second light reception amount from the first light reception amount is set as the detection threshold, it is possible to reliably determine whether the light emitted from the light emission unit to the light reception unit is incident. Accordingly, it is possible to more accurately detect the origin position of the gear or the like.

In the first aspect, it is preferable to include the power device that supplies power to the control unit, and the threshold setting unit sets the detection threshold whenever the power device is turned on.

According to the first aspect with this configuration, whenever the power device is turned on, the detection threshold is set by the threshold setting unit. Therefore, the detection threshold matching the degree of degradation of the light emission unit and the light reception unit can be set. Accordingly, the origin position can be detected very accurately by the origin position detection unit.

An optical device according to a second aspect of the invention includes: the position detection device described above; an optical element that converts a polarization direction of light incident according to a rotation angle; a rotation adjustment unit that holds the optical element and adjusts the rotation angle of the optical element; a transmission unit that transmits power used for the rotation adjustment unit to adjust the rotation angle to the rotation adjustment unit; and a frame unit that holds the rotation adjustment unit and the transmission unit. The rotation adjustment unit and the transmission unit are disposed so that the frame unit is interposed between the rotation adjustment unit and the transmission unit. The transmission unit includes the gear.

A ½ wavelength plate (phase difference plate) can be exemplified as the optical element.

According to the second aspect, it is possible to obtain the same advantages as those of the position detection device according to the first aspect. By adjusting the origin position of the gear included in the transmission unit, it is possible to adjust the origin position of the rotation angle of the optical element. Thus, it is possible to adjust the rotation angle of the optical element to a desired angle. Accordingly, it is possible to accurately adjust a ratio between polarized components of the light passing through the optical element to a desired ratio.

A light source device according to a third aspect of the invention includes: an excited light source that exits excited light; a wavelength conversion device that converts a part of the excited light emitted from the excited light source into fluorescent light; a light combination device that combines another part of the excited light with the fluorescent light and emits the combined light; and the optical device that is disposed between the excited light source and the wavelength conversion device.

According to the third aspect, it is possible to obtain the same advantages as those of the optical device according to the second aspect. By accurately adjusting a rotation angle of the optical element (for example, ½ wavelength plate) of the optical device disposed between the excited light source and the wavelength conversion device, it is possible to accurately adjust a ratio of the fluorescent light to the excited light combined by the light combination device. Accordingly, it is possible to exit desired light (illumination light) from the light source device.

A projector according to a fourth aspect of the invention includes: the light source device described above; a light modulation device that modulates light emitted from the light source device; and a projection optical device that projects the light modulated by the light modulation device.

According to the fourth aspect, it is possible to obtain the same advantages as those of the light source device according to the third aspect. Since the desired illumination light is projected from the light source device, it is possible to improve luminance and saturation of a projected image projected from the projector.

An optical device according to a fifth aspect of the invention includes: an optical element that converts a polarization direction of light incident according to a rotation angle; a rotation adjustment unit that holds the optical element and adjusts the rotation angle of the optical element; a transmission unit that transmits power used for the rotation adjustment unit to adjust the rotation angle to the rotation adjustment unit; and a frame unit that holds the rotation adjustment unit and the transmission unit. The rotation adjustment unit and the transmission unit are disposed so that the frame unit is interposed between the rotation adjustment unit and the transmission unit.

A phase difference element (½ wavelength plate) converting a polarization direction of incident light can be exemplified as the optical element.

According to the fifth aspect, since the rotation adjustment unit that adjusts the rotation angle of the optical element and the transmission unit that transmits the power used for the rotation adjustment unit to adjust the rotation angle to the rotation adjustment unit are disposed with the frame unit interposed therebetween, it is possible to reduce a possibility that dust (for example, grease) attached to at least the transmission unit is attached to the optical element. Accordingly, it is possible to improve dust resistance of the optical device.

In the fifth aspect, it is preferable that the frame unit includes a first erect portion that is erect from a first side surface on which the transmission unit is disposed and a second erect portion that is erect from a second side surface on which the rotation adjustment unit is disposed.

According to the fifth aspect with this configuration, since the first erect portion and the second erect portion erect from the first side surface and the second side surface of the frame unit respectively, the first side surface can be divided into two regions by the first erect portion and the second side surface can be divided into two regions by the second erect portion. Accordingly, in a case in which the rotation adjustment unit is disposed in one region of the two regions of the second side surface divided by the second erect portion, it is possible to prevent the rotation adjustment unit, and further the optical element held in the rotation adjustment unit, from being affected by members or the like disposed in the other region.

In the fifth aspect, it is preferable to include a driving unit that is disposed on the second side surface and generates the power. It is preferable that the rotation adjustment unit includes a holder that holds the optical element and a first gear that transmits the power from the transmission unit to the holder, the frame unit has an opening according to the optical element, the first erect portion is erect between the transmission unit and the opening, and the second erect portion is erect between the driving unit and the first gear.

According to the fifth aspect with this configuration, the driving unit is disposed on the second side surface. Therefore, for example, it is possible to reduce the thickness dimension of the optical device more than in a case in which the driving unit is disposed on the first side surface.

Since the second erect portion is erect between the rotation adjustment unit and the driving unit on the second side surface, the driving unit and the rotation adjustment unit can be divided by the first erect portion. Further, since the first erect portion is erect between the opening and the transmission unit on the first side surface, dust attached to the transmission unit can be prevented from being splashed to the opening. Further, dust can be prevented from being attached to the optical element via the opening.

In the fifth aspect, it is preferable to include a first urging member that urges the holder toward the first gear and a second urging member that urges the holder toward a rotation center of the holder. It is preferable that the first urging member comes into contact with the second erect portion.

For example, in a case in which temperature of the rotation adjustment unit increases due to light or the like incident on the optical element, the holder and the first gear included in the rotation adjustment unit are considered to be deformed. In contrast, according to the fifth aspect with the configuration described above, the first urging member urges the holder toward the first gear and the second urging member urges the holder toward the rotation center of the holder. Therefore, even in a case in which the holder and the first gear are slightly deformed, the holder can reliably be rotated in tune with the rotation of the first gear. Accordingly, it is possible to reliably adjust the rotation angle of the optical element held in the holder.

In the fifth aspect, it is preferable to include a detection unit that detects the rotation angle, and the detection unit is disposed on a first side surface on which the transmission unit is disposed.

According to the fifth aspect with this configuration, the detection unit disposed on the first side surface can detect a rotation angle of the optical element.

Here, the rotation adjustment unit is considered to be disposed inside the casing included in the light source device. In this case, when the detection unit is disposed on the side of the rotation adjustment unit, that is, the second side surface, the detection unit is also disposed inside the casing, there is a concern of the detection unit being damaged at the time of increase in temperature inside the casing.

In contrast, according to the fifth aspect with the configuration described above, the detection unit is disposed on the first side surface. Therefore, even in a case in which the rotation adjustment unit is disposed inside the casing, it is possible to prevent the detection unit from being damaged.

A light source device according to a sixth aspect of the invention includes: a light source; the optical device; and a casing that accommodates at least a part of the optical device and the light source.

According to the sixth aspect, it is possible to obtain the same advantages as those of the optical device according to the first aspect. Since at least parts of the light source and the optical device are accommodated inside the casing, it is possible to prevent dust from being attached to parts of the light source and the optical device disposed inside the casing. Accordingly, it is possible to improve dust resistance of the optical device. Further, it is possible to improve dust resistance of the light source device.

Since the first erect portion and the second erect portion of the optical device form parts of the casing, a part of the optical device can easily be accommodated inside the casing.

In the sixth aspect, it is preferable that the rotation adjustment unit in the optical device is accommodated inside the casing, and the transmission unit is disposed out of the casing.

According to the sixth aspect with this configuration, since the rotation adjustment unit is accommodated inside the casing and the transmission unit is disposed out of the casing, it is possible to reliably prevent dust such as grease attached to the transmission unit from being attached to the rotation adjustment unit and further from being attached to the optical element held in the rotation adjustment unit. Since the detection unit and the driving unit are disposed out of the casing, it is possible to prevent the detection unit and the driving unit from being damaged due to an increase in the temperature inside the casing.

Further, since it is possible to considerably reduce the possibility of dust being attached to the optical element, it is possible to prevent the amount of light emitted via the optical element from being reduced.

A projector according to a seventh aspect of the invention includes: the light source device described above; a light modulation device that modulates light emitted from the light source device; and a projection optical device that projects the light modulated by the light modulation device.

According to the seventh aspect, it is possible to obtain the same advantages as those of the optical device according to the first aspect and the light source device according to the second aspect. It is possible to prevent the amount of light emitted from the light source device from being reduced. Therefore, it is possible to prevent luminance and saturation of a projected image projected from the projector from being reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Schematic Configuration of Projector

Figure 1:
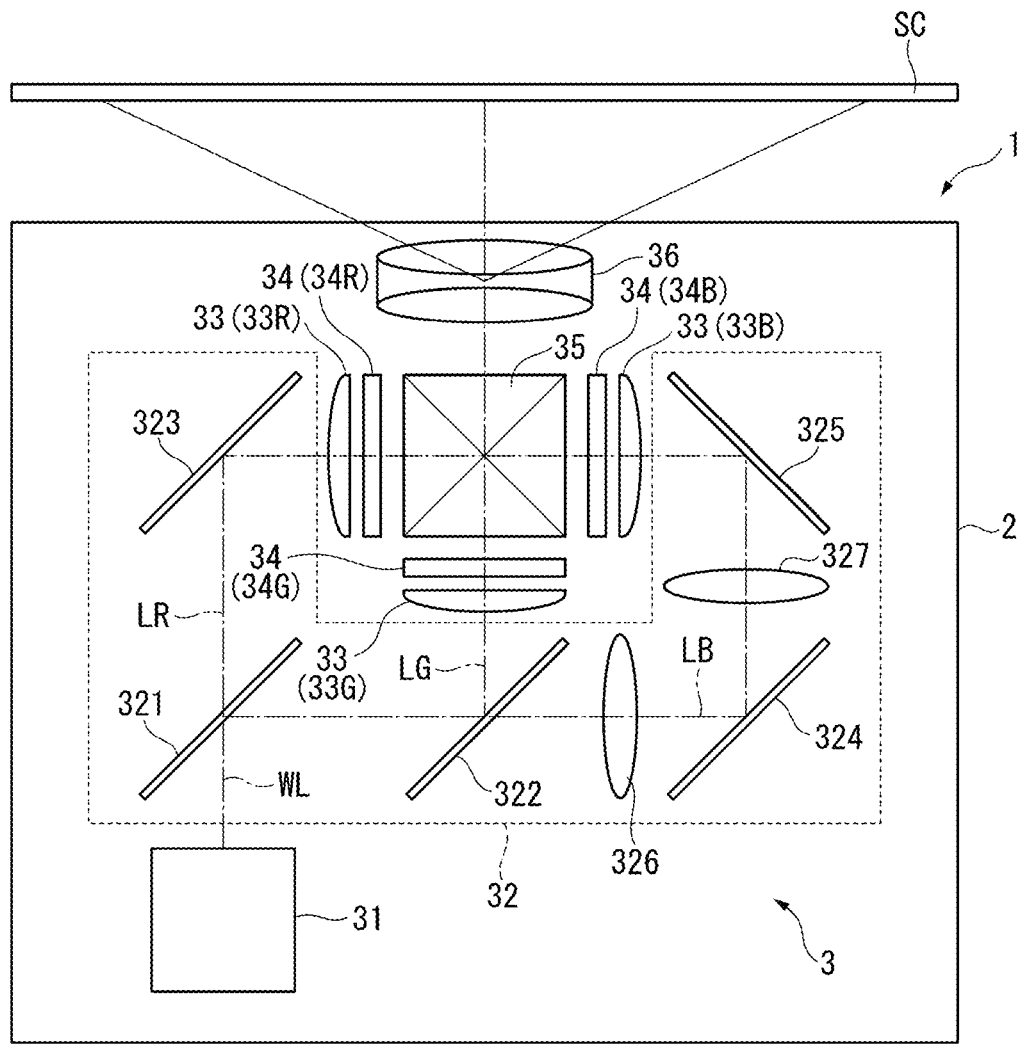
FIG. 1 is a schematic diagram illustrating a schematic configuration of a projector according to an embodiment of the invention.

FIG. 1 is a schematic diagram illustrating the configuration of a projector 1 according to the embodiment.

The projector 1 according to the embodiment modulates light emitted from an illumination device 31 installed inside, forms an image according to image information, and expands and projects the image to a screen SC which is a projection surface.

As will be described in detail below, the projector 1 includes an optical device 5 (see FIG. 2) that adjusts a rotation angle of an optical element 5 (½ wavelength plate) and is configured such that a rotation angle of the optical element can be adjusted by the optical device as one of the characteristics.

As illustrated in FIG. 1, the projector 1 includes an exterior casing 2 and an optical unit 3 that is accommodated in the exterior casing 2. In addition, although not illustrated, the projector 1 includes a control device that controls the projector 1, a cooling device that cools cooling targets such as optical components, and a power device that supplies power to electronic components.

Configuration of Optical Unit

The optical unit 3 includes an illumination device 31, a color separation device 32, a parallelization lens 33, light modulation devices 34, a color combination device 35, and a projection optical device 36.

The illumination device 31 emits illumination light WL. The configuration of the illumination device 31 will be described in detail below.

The color separation device 32 separates the illumination light WL incident from the illumination device 31 into red light LR, green light LG, and blue light LB. The color separation device 32 includes dichroic mirrors 321 and 322, reflection mirrors 323, 324, and 325, and relay lenses 326 and 327.

Of these constituents, the dichroic mirror 321 separates the red light LR and other color light (the green light LG and the blue light LB) from the illumination light WL. The separated red light LR is reflected by the reflection mirror 323 and is guided to the parallelization lens 33 (33R). The separated other color light is incident on the dichroic mirror 322.

The dichroic mirror 322 separates the other color light into the green light LG and the blue light LB. The separated green light LG is guided to the parallelization lens (33G). The separated blue light LB is guided to the parallelization lens 33 (33B) via the relay lens 326, the reflection mirror 324, the relay lens 327, and the reflection mirror 325.

The parallelization lens 33 (in which parallelization lenses for the red color light LR, the green color light LG, and the blue color light LB are referred to as 33R, 33G, and 33B) parallelizes the incident light.

The light modulation devices 34 (where light modulation devices for the red color light LR, the green color light LG, and the blue color light LB are referred to as 34R, 34G, and 34B, respectively) modulates the pieces of incident color light LR, LG, and LB to form image light according to image information. The light modulation devices 34 are configured to include liquid crystal panels that modulate the incident color light and pairs of polarization plates that are disposed on the incidence side and the exit side of the light modulation devices 34R, 34G, and 34B. An illumination region for the illumination device 31 to be described below is set as an image formation region (modulation region) in which the light modulation device 34 modulates the incident color light to form an image.

The color combination device 35 combines pieces of image light (pieces of image light formed by the pieces of color light LR, LG, and LB) incident from the light modulation devices 34R, 34G, and 34B. The color combination device 35 can be configured by, for example, a cross dichroic prism, but may be configured by a plurality of dichroic mirrors.

The projection optical device 36 projects the image light combined by the color combination device 35 to the screen SC which is a projection surface. As such a projection optical device, an assembled lens in which a plurality of lenses are disposed in a barrel can be adopted, although not illustrated.

The optical unit 3 projects an expanded image to the screen SC.

Configuration of Illumination Device

Figure 2:
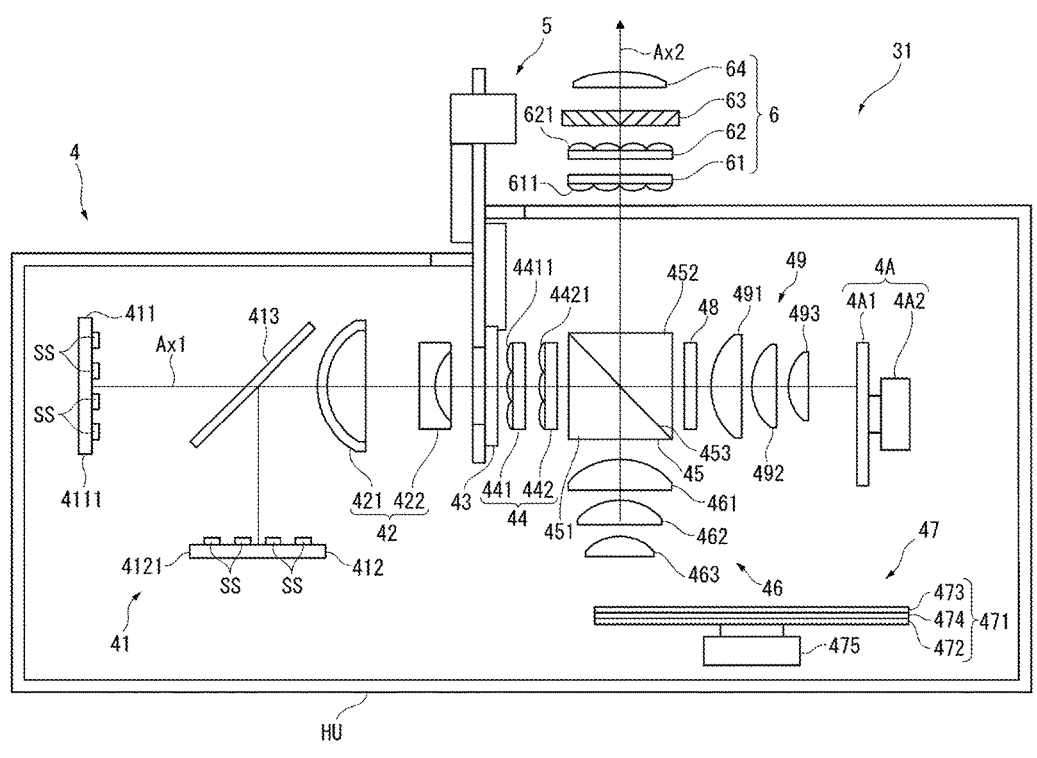
FIG. 2 is a schematic diagram illustrating the configuration of an illumination device according to the embodiment.

FIG. 2 is a schematic diagram illustrating the configuration of the illumination device 31.

The illumination device 31 emits the illumination light WL toward the color separation device 32. As illustrated in FIG. 2, the illumination device 31 includes a light source device 4 and a uniformization device 6.

Configuration of Light Source Device

The light source device 4 emits a light flux to the uniformization device 6. The light source device 4 includes a light source unit 41, an afocal optical element 42, a first phase difference element 43, a homogenizer optical element 44, a light separation element 45, a first condensing element 46, a wavelength conversion device 47, a second phase difference element 48, a second condensing element 49, a diffusion element 4A, an optical device 5, and a casing HU.

Of these constituents, the light source unit 41, the afocal optical element 42, the first phase difference element 43, the homogenizer optical element 44, the light separation element 45, the second phase difference element 48, the second condensing element 49, and the diffusion element 4A are disposed on a first illumination optical axis Ax1 set in the light source device 4. The light separation element 45 is disposed at a portion in which the first illumination optical axis Ax1 and a second illumination optical axis Ax2 perpendicular to the first illumination optical axis Ax1 intersect each other.

On the other hand, the first condensing element 46 and the wavelength conversion device 47 are disposed on the second illumination optical axis Ax2. The light source unit 41, the afocal optical element 42, the first phase difference element 43, the homogenizer optical element 44, the light separation element 45, the first condensing element 46, the wavelength conversion device 47, the second phase difference element 48, the second condensing element 49, the diffusion element 4A, and the optical device 5 (a part of the optical device 5) are accommodated inside the casing HU.

Configuration of Light Source Unit

The light source unit 41 corresponds to an excited light source according to the invention and emits excited light which is blue light toward the afocal optical element 42. The light source unit 41 includes a first light source unit 411, a second light source unit 412, and a light combination member 413.

The first light source unit 411 includes a solid-state light source array 4111 in which a plurality of solid-state light sources SS which are laser diodes (LD) are arrayed in a matrix form and a plurality of parallelization lenses (not illustrated) corresponding to the solid-state light sources SS. Similarly, the second light source unit 412 includes a solid-state light source array 4121 in which a plurality of solid-state light sources SS are arrayed in a matrix form and a plurality of parallelization lenses (not illustrated) corresponding to the solid-state light sources SS. The solid-state light source SS emits, for example, excited light with a peak wavelength of 440 nm, but may emit excited light with a peak wavelength of 446 nm. The solid-state light sources emitting the pieces of excited light with the peak wavelengths 440 nm and 446 nm may be mixed in the light source units 411 and 412. The pieces of excited light emitted from the solid-state light sources SS are parallelized by the parallelization lenses to be incident on the light combination member 413. In the embodiment, the excited light emitted from each solid-state light source SS is S-polarized light.

The light combination member 413 transmits the excited light emitted along the first illumination optical axis Ax1 from the first light source unit 411, reflects the excited light emitted in a direction perpendicular to the first illumination optical axis Ax1 from the second light source unit 412 along the first illumination optical axis Ax1, and combines the pieces of excited light. Although not illustrated in detail, the light combination member 413 is configured as plate-shaped body in which a plurality of transmission portions that are disposed at incidence positions of the excited light emitted from the first light source unit 411 and transmit the excited light and a plurality of reflection portions that are disposed at incident positions of the excited light emitted from the second light source unit 412 and reflect the excited light are alternately disposed. The excited light via the light combination member 413 is incident on the afocal optical element 42.

Configuration of Afocal Optical Element

The afocal optical element 42 adjusts a light flux diameter of the excited light incident from the light source unit 41. Specifically, the afocal optical element 42 is an optical element that condenses the excited light incident as parallel light from the light source unit 41 to contract the light flux diameter, further parallelizes the excited light, and emits the excited light. The afocal optical element 42 is configured to include lenses 421 and 422 which are a convex lens and a concave lens, respectively, and the excited light emitted from the light source unit 41 is condensed by the afocal optical element 42 to be incident on the first phase difference element 43 and further the homogenizer optical element 44.

Configuration of First Phase Difference Element

The first phase difference element 43 is a ½ wavelength plate. In regard to the excited light which is the S-polarized light transmitted through the first phase difference element 43 and emitted from the light source unit 41, a part of the S-polarized light is converted into P-polarized light and becomes light in which the S-polarized light and the P-polarized light are mixed. The excited light transmitted through the first phase difference element 43 is incident on the homogenizer optical element 44.

In the embodiment, the first phase difference element 43 is configured to be rotatable about an optical axis (which is identical to the first illumination optical axis Ax1) of the first phase difference element 43. By rotating the first phase difference element 43, it is possible to adjust a ratio between the S-polarized light and the P-polarized light in the excited light transmitted through the first phase difference element 43 according to a rotation amount (rotation angle) of the first phase difference element 43. The configuration of the optical device 5 rotating the first phase difference element 43 will be described below.

Configuration of Homogenizer Optical Element

The homogenizer optical element 44 uniformizes an illuminance distribution of the excited light incident on a fluorescent layer 473 which is an illumination region in the wavelength conversion device 47 to be described below. The homogenizer optical element 44 includes a first multilens 441 and a second multilens 442.

The first multilens 441 has a configuration in which a plurality of first lenses 4411 are arrayed in a matrix form on a plane perpendicular to the first illumination optical axis Ax1 and divides the excited light incident by the plurality of first lenses 4411 into a plurality of partial light fluxes (excited partial light fluxes).

The second multilens 442 has a configuration in which a plurality of second lenses 4421 according to the plurality of first lenses 4411 are arrayed in a matrix form on a plane perpendicular to the first illumination optical axis Ax1. The second multilens 442 superimposes the plurality of excited partial light fluxes divided by the first lenses 4411 on the fluorescent layer 473 which is the illumination region in cooperation with the second lenses 4421 and the second condensing element 49. Thus, illuminance of a plane (a plane perpendicular to the second illumination optical axis Ax1) perpendicular to a central axis of the excited light incident on the fluorescent layer 473 is uniformized.

The excited light via the homogenizer optical element 44 is incident on the light separation element 45.

The multilenses 441 and 442 included in the homogenizer optical element 44 are configured to be movable along a surface perpendicular to the first illumination optical axis Ax1. That is, although not illustrated, the homogenizer optical element 44 includes a first frame that supports the first multilens 441, a second frame that supports the first frame to be movable along one axis of two axes perpendicular to the first illumination optical axis Ax1, and a third frame that supports the second frame to be movable along the other axis. The homogenizer optical element 44 further includes another first frame that supports the second multilens 442, another second frame that supports the other first frame to be movable along one axis of two axes perpendicular to the first illumination optical axis Ax1, and another third frame that supports the other second frame to be movable along the other axis. When the multilenses 441 and 442 are moved, a traveling direction of the excited light emitted from the homogenizer optical element 44 is adjusted.

The multilenses 441 and 442 may be unmovable independently or the multilenses 441 and 442 may be movable simultaneously.

Configuration of Light Separation Element

The light separation element 45 is a prism type polarizing beam splitter (PBS) and is formed in a appropriately rectangular parallelepiped shape as a whole in which prisms 451 and 452 formed in appropriately triangular prism shapes are bonded on their boundary surfaces. The boundary surfaces of the prisms 451 and 452 are inclined at appropriately 45° with respect to the first illumination optical axis Ax1 and the second illumination optical axis Ax1. A polarized light separation layer 453 having wavelength selectivity is formed on the boundary surface of the prism 451 located on the side of the homogenizer optical element 44 (that is, the side of the light source unit 41) in the light separation element 45.

The light separation element 45 is equivalent to a light combination device according to the invention.

The polarized light separation layer 453 has not only characteristics in which the S-polarized light (first excited light) and the P-polarized light (second excited light) included in the excited light are separated but also characteristics in which fluorescent light occurring because of incidence of the excited light on the wavelength conversion device 47 to be described below is transmitted irrespective of a polarized state of the fluorescent light. That is, the polarized light separation layer 453 has polarization separation characteristics of wavelength selectivity in which light with a predetermined wavelength region is separated into S-polarized light and P-polarized light and light with another predetermined wavelength region is transmitted as S-polarized light and P-polarized light.

The light separation element 45 transmits the P-polarized light in the excited light incident from the homogenizer optical element 44 to the side of the second phase difference element 48 along the first illumination optical axis Ax1 and reflects the S-polarized light to the side of the first condensing element 46 along the second illumination optical axis Ax1. That is, the light separation element 45 exits the P-polarized light of the excited light toward the second phase difference element 48 (further the diffusion element 4A) and exits the S-polarized light toward the first condensing element 46.

Configuration of First Condensing Element

The excited light of the S-polarized light transmitted through the homogenizer optical element 44 and reflected from the polarized light separation layer 453 is incident on the first condensing element 46. The first condensing element 46 condenses (converges) the excited light on the wavelength conversion element 471, and also condenses and parallelizes the fluorescent light emitted from the wavelength conversion element 471 to exit the fluorescent light toward the polarized light separation layer 453. The number of lenses included in the first condensing element 46 is configured as three pickup lenses 461 to 463. However, the number of lenses included in the first condensing element 46 is not limited to three.

Configuration of Wavelength Conversion Device

The wavelength conversion device 47 converts the incident excited light into fluorescent light. The wavelength conversion device 47 includes a wavelength conversion element 471 and a rotation device 475.

Of these constituents, the rotation device 475 is configured with a motor or the like rotating the wavelength conversion element 471 formed in a flat plate shape.

The wavelength conversion element 471 includes a substrate 472, and a fluorescent layer 473 and a reflection layer 474 located on the surface of the substrate 472 on which the excited light is incident.

The substrate 472 is formed in a appropriately circular shape when viewed from the incidence side of the excited light. The substrate 472 can be formed of metal or ceramics.

The fluorescent layer 473 contains a fluorescent substance which is excited by the incident excited light and exits fluorescent light (for example, fluorescent light with a peak wavelength in a wavelength region of 500 to 700 nm) which is unpolarized light. A part of the fluorescent light generated in the fluorescent layer 473 exits toward the first condensing element 46 and the other part of the fluorescent light exits toward the reflection layer 474.

The reflection layer 474 is disposed between the fluorescent layer 473 and the substrate 472 and reflects the fluorescent light incident from the fluorescent layer 473 toward the first condensing element 46.

When the excited light is emitted to the wavelength conversion element 471, the fluorescent light is diffused and emitted toward the first condensing element 46 by the fluorescent layer 473 and the reflection layer 474. The fluorescent light is incident on the polarized light separation layer 453 of the light separation element 45 via the first condensing element 46, is transmitted through the polarized light separation layer 453 along the second illumination optical axis Ax2, and is incident on the uniformization device 6. That is, the fluorescent light generated in the wavelength conversion element 471 is emitted in the direction of the second illumination optical axis Ax2 by the light separation element 45.

The wavelength conversion device 47 is configured such that at least the position of the fluorescent layer 473 is movable along the second illumination optical axis Ax2 in the first condensing element 46. Specifically, in the embodiment, the entire wavelength conversion device 47 is configured to be movable along the second illumination optical axis Ax2. That is, although not illustrated, the wavelength conversion device 47 includes a movement mechanism that supports the rotation device 475 to be movable along the second illumination optical axis Ax1. By moving the wavelength conversion device 47 (the fluorescent layer 473) in this way, it is possible to adjust a defocus position of the excited light with respect to the fluorescent layer 473. Therefore, it is possible to adjust a light flux diameter of the fluorescent light diffused and emitted from the wavelength conversion device 47. Further, it is possible to adjust a light flux diameter of the fluorescent light reflected from the polarized light separation layer 453 and traveling toward the uniformization device 6.

Configurations of Second Phase Difference Element, Second Condensing Element, and Diffusion Element The second phase difference element 48 is a ¼ wavelength plate and converts a polarization state of the excited light (linearly polarized light) incident from the light separation element 45 into circularly polarized light.

The second condensing element 49 is an optical element that condenses (converges) the excited light transmitted through the second phase difference element 48 on the diffusion element 4A and is configured to include three pickup lenses 491 to 493 in the embodiment. However, the number of lenses included in the second condensing element 49 is not limited to three, as in the first condensing element 46.

The diffusion element 4A diffuses and reflects the incident excited light at the same diffusion angle as the fluorescent light generated and emitted by the wavelength conversion device 47. The diffusion element 4A includes a reflection plate 4A1 that performs Lambertain reflection on the incident light and a rotation device 4A2 that rotates and cools the reflection plate 4A1.

The excited light diffused and reflected by the diffusion element 4A is incident again on the second phase difference element 48 via the second condensing element 49. At the time of reflection by the diffusion element 4A, the circularly polarized light incident on the diffusion element 4A is converted into excited light of the S-polarized light rotated at 90 degrees with respect to the polarized light of the excited light while the circularly polarized light is circularly polarized light which is reversely rotated and is transmitted through the second phase difference element 48. Then, the excited light is reflected by the polarized light separation layer 453 and is incident as blue light on the uniformization device 6 along the second illumination optical axis Ax1. That is, the excited light diffused and reflected by the diffusion element 4A exits in the direction of the second illumination optical axis Ax2 by the light separation element 45.

The second condensing element 49 is configured to be movable along a plane perpendicular to the first illumination optical axis Ax1. That is, although not illustrated, the second condensing element 49 includes a holding body that holds the pickup lenses 491 to 493, a first support body that supports the holding body to be movable along one axis of two axes perpendicular to the first illumination optical axis Ax1, and a second support body that supports the first support body to be movable along the other axis. By moving the second condensing element 49 in this way, it is possible to adjust an incident angle of the excited light (blue light) diffused by the diffusion element 4A on the polarized light separation layer 453 and further an inclination angle of the excited light reflected by the polarized light separation layer 453 and traveling toward the uniformization device 6 with respect to the second illumination optical axis Ax2. When the homogenizer optical element 44 is moved, a light path of the excited light passing through the homogenizer optical element 44 is changed, and thus a light path of the excited light passing through the second condensing element 49 is also changed. Thus, in the movement of the second condensing element 49, a function of complementing a change in the light path of the blue light by the movement of the homogenizer optical element 44 is also realized.

In the embodiment, the diffusion element 4A is configured to be movable along the first illumination optical axis Ax1. That is, although not illustrated, the diffusion element 4A has a movement mechanism that supports the rotation device 4A2 to be movable along the first illumination optical axis Ax1. By moving the diffusion element 4A in this way, it is possible to adjust the light flux diameter of the excited light incident on the diffusion element 4A. Therefore, it is possible to adjust the light flux diameter of the excited light diffused by the diffusion element 4A and further the light flux diameter of the excited light reflected by the polarized light separation layer 453 and traveling toward the uniformization device 6.

In this way, after the S-polarized light (first excited light) of the excited light incident on the light separation element 45 via the homogenizer optical element 44 is wavelength-converted into the fluorescent light by the wavelength conversion device 47, the light is transmitted through the light separation element 45 and is incident on the uniformization device 6. On the other hand, the P-polarized light (second excited light) is diffused and reflected by the incidence on the diffusion element 4A, is transmitted twice through the second phase difference element 48, is reflected by the light separation element 45, and is incident as blue light on the uniformization device 6. That is, the blue light, the green light, the red light are combined in the light separation element 45, exit in the direction of the second illumination optical axis Ax1, and are incident as white illumination WL on the uniformization device 6.

Configuration of Uniformization Device

The uniformization device 6 uniformizes illumination of a surface (a light axis perpendicular surface) perpendicular to the central axis of the illumination light WL incident from the light source device 4. Specifically, the uniformization device 6 uniformizes an illumination distribution of a light flux in an image formation region (modulation region) which is an illumination region in each light modulation device 34 (34R, 34G, and 34B). The uniformization device 6 includes a first lens array 61, a second lens array 62, a polarized light conversion element 63, and a superimposition lens 64. The first lens array 61, the second lens array 62, the polarized light conversion element 63, and the superimposition lens 64 are disposed so that their optical axes are identical to the second illumination optical axis Ax2.

The first lens array 61 has a configuration in which a plurality of small lenses 611 which are small lenses are arrayed in a matrix form on the light axis perpendicular surface (a surface perpendicular to the second illumination light axis Ax1 in the first lens array 61). The incident illumination light WL is separated into a plurality of partial light fluxes by the plurality of small lenses 611.

The second lens array 62 has a configuration in which a plurality of small lenses 621 are arrayed in a matrix form on the light axis perpendicular surface, as in the first lens array 61. The small lenses 621 have a one-to-one relation with the corresponding small lenses 611. That is, the partial light fluxes emitted from the corresponding small lenses 611 are incident on the certain small lenses 621. The small lenses 621 superimpose the plurality of partial light flux separated by the small lenses 611 on the image formation regions of the light modulation devices 34 along with the superimposition lens 64.

The polarized light conversion element 63 is disposed between the second lens array 62 and the superimposition lens 64 and has a function of arranging polarization directions of the plurality of incident partial light fluxes.

Configuration of Optical Device

Figure 3:
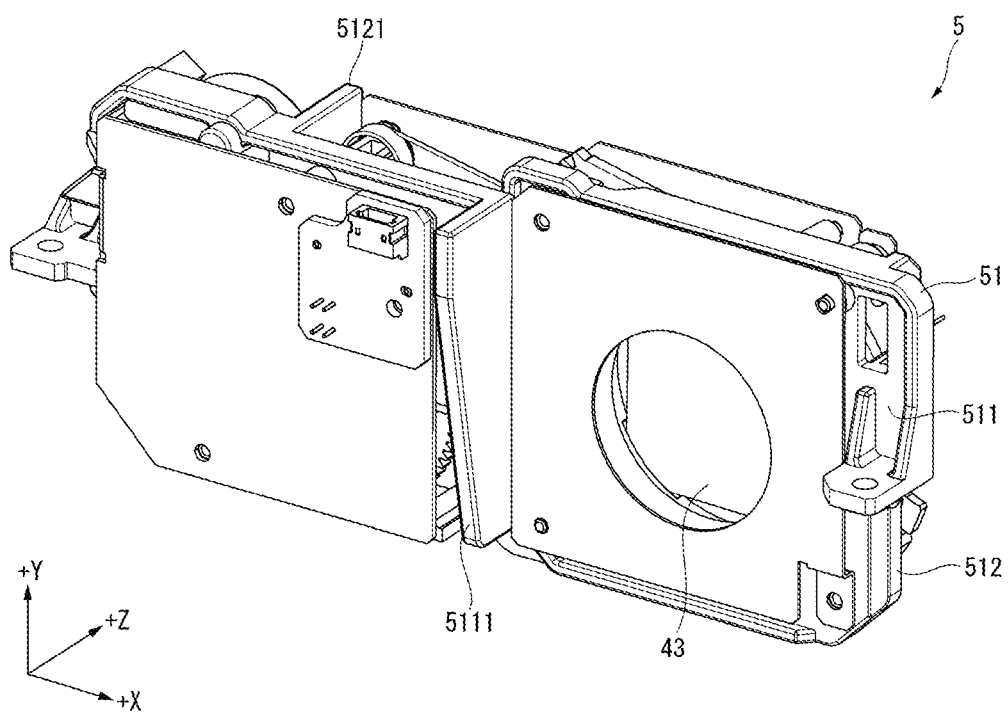
FIG. 3 is a perspective view illustrating an optical device when viewed from a light incidence side according to the embodiment.
Figure 4:
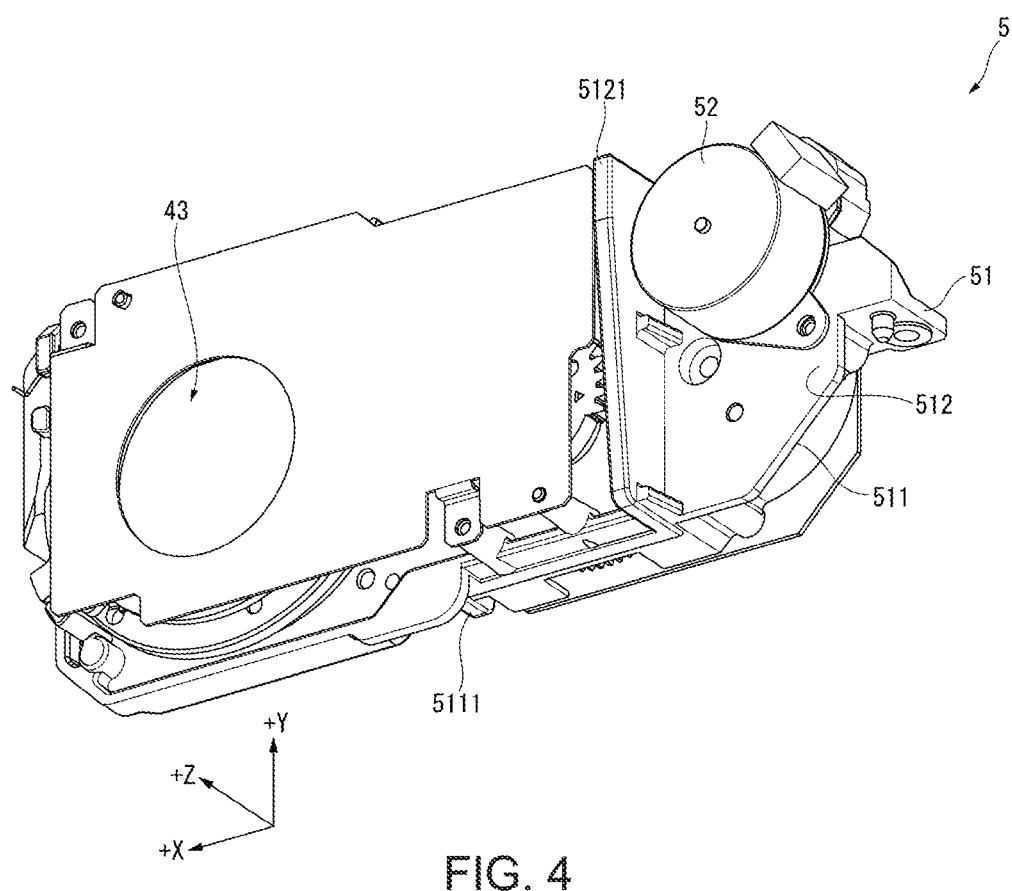
FIG. 4 is a perspective view illustrating the optical device when viewed from a light exit side according to the embodiment.
Figure 5:
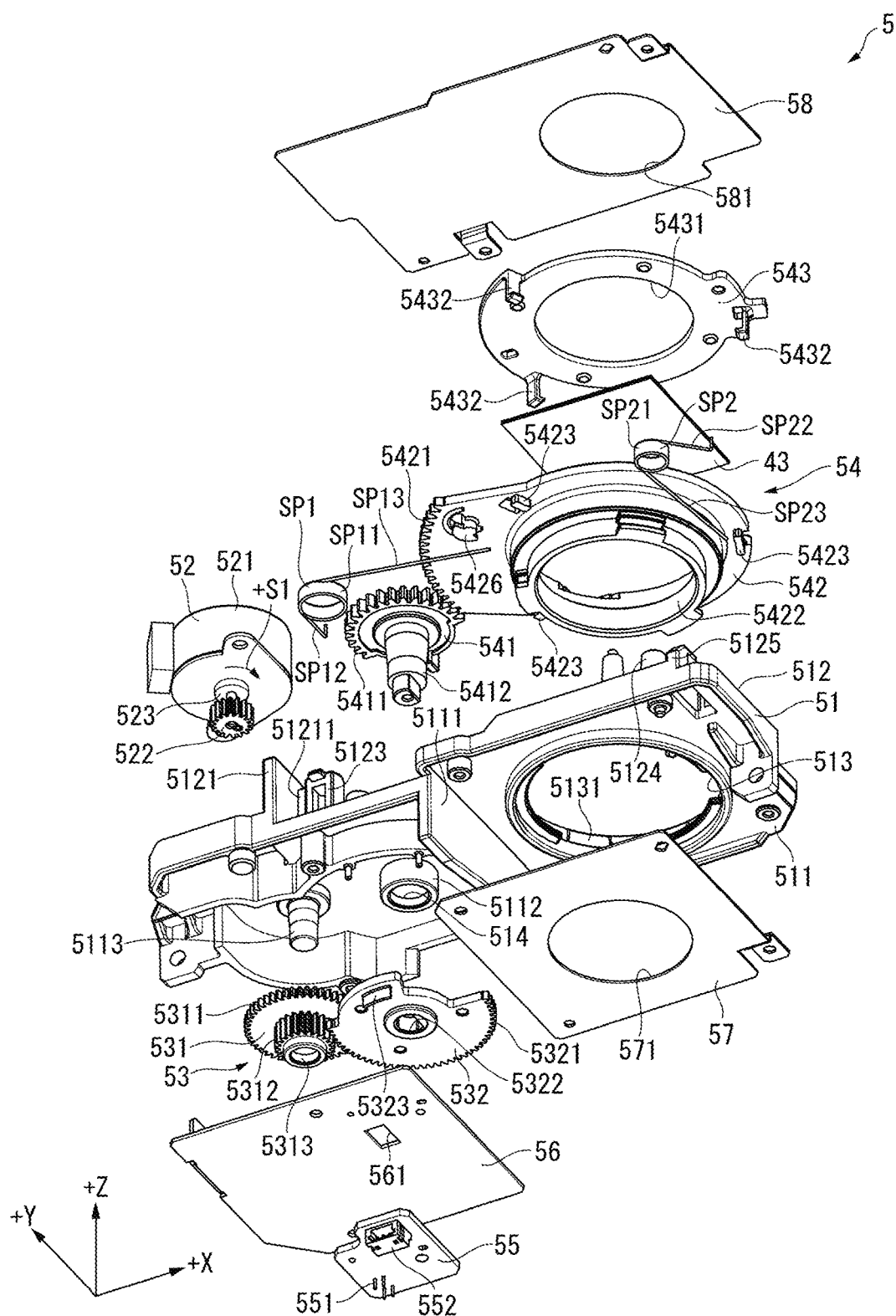
FIG. 5 is an exploded perspective view illustrating the optical device when viewed from the light incidence side according to the embodiment.
Figure 6:
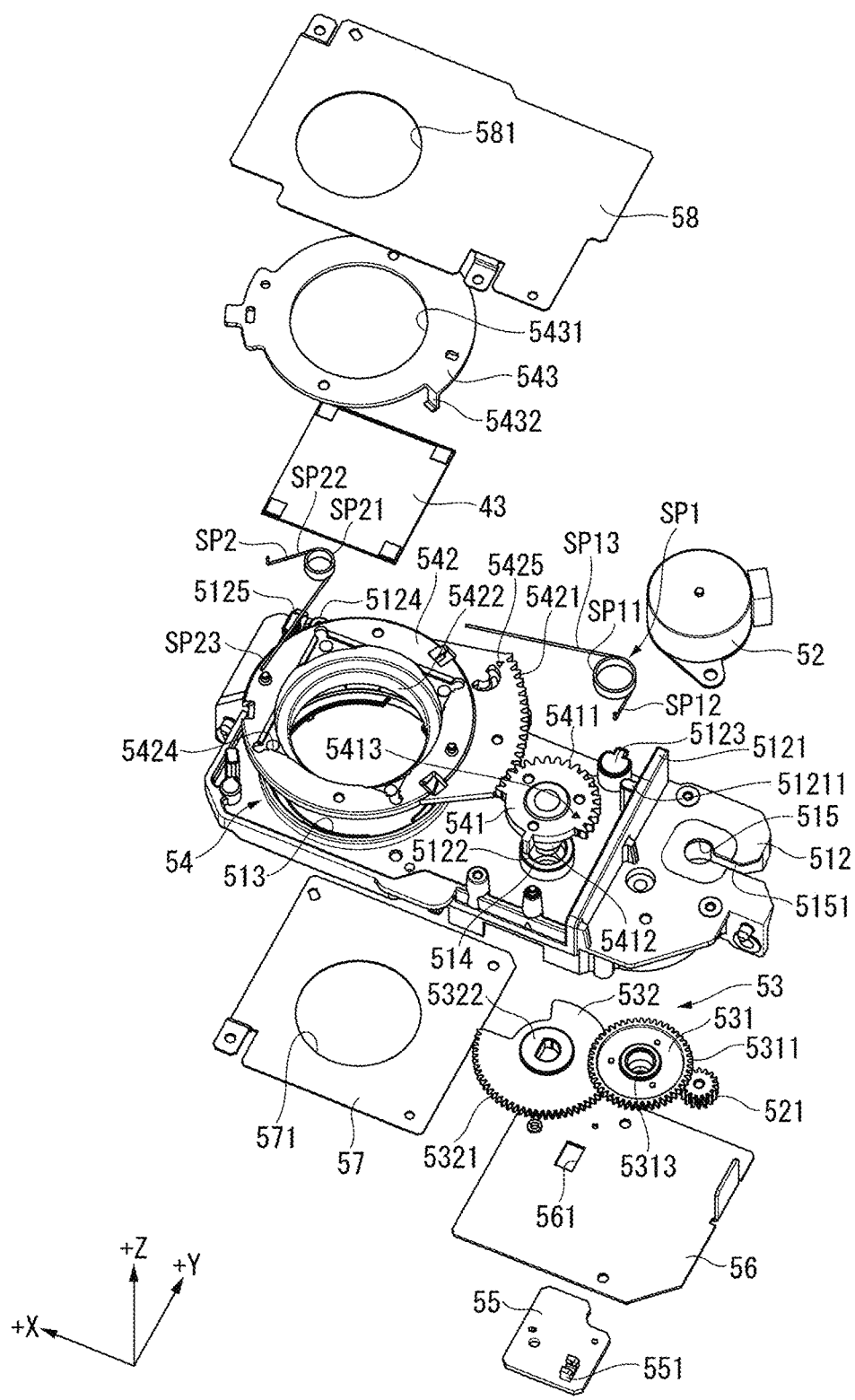
FIG. 6 is an exploded perspective view illustrating the optical device when viewed from the light exit side according to the embodiment.

FIG. 3 is a perspective view illustrating the optical device 5 when viewed from a light incidence side. FIG. 4 is a perspective view illustrating the optical device 5 when viewed from a light exit side. FIG. 5 is an exploded perspective view illustrating the optical device 5 when viewed from the light incidence side. FIG. 6 is an exploded perspective view illustrating the optical device 5 when viewed from the light exit side.

The optical device 5 has a function of adjusting a rotation angle of the first phase difference element 43. As illustrated in FIGS. 3 to 6, the optical device 5 includes a frame unit 51, a driving unit 52, a transmission unit 53, a rotation adjustment unit 54, a sensor unit 55, a first cover unit 56, a second cover unit 57, and a third cover unit 58.

In the following description, a traveling direction of light incident on the first phase difference element 43 held by the optical device 5 is referred to as a +Z direction, and directions perpendicular to the +Z direction and perpendicular to each other are referred to as +X and +Y directions. In the embodiment, since the +Z direction is a direction oriented from a first side surface 511 of the frame unit 51 to a second side surface 512, the +Y direction is assumed to be a direction oriented from the bottom surface to the top surface of the frame unit 51 and the +X direction is assumed to be a direction oriented from the left to the right when the frame unit 51 (the optical device 5) is viewed from the side of the first side surface 511.

Configuration of Frame Unit

The frame unit 51 has a function of holding the driving unit 52, the transmission unit 53, the rotation adjustment unit 54, the sensor unit 55, the first cover unit 56, the second cover unit 57, and the third cover unit 58. As illustrated in FIGS. 3 to 6, the frame unit 51 is formed in a appropriately flat shape and includes a first side surface 511 located in the −Z direction and a second side surface 512, a first opening 513, a second opening 514, and a third opening 515 located in the +Z direction. Of these constituents, the transmission unit 53, the sensor unit 55, the first cover unit 56, and the second cover unit 57 are disposed on the first side surface 511 of the frame unit 51.

On the other hand, the driving unit 52, the rotation adjustment unit 54, and the third cover unit 58 are disposed on the second side surface 512. That is, the transmission unit 53 and the rotation adjustment unit 54 are disposed on opposite sides with the frame unit 51 interposed therebetween.

The first side surface 511 includes a first erect portion 5111 that is erect from the first side surface 511 in the −Z direction, an annular projection portion 5112 that projects in the −Z direction, and a shaft portion 5113 that extends in the −Z direction. Of these constituents, the first erect portion 5111 forms a part of the above-described casing HU. The first erect portion 5111 is located between the transmission unit 53 disposed on the first side surface 511 and the first opening 513.

Further, the transmission unit 53 to be described below engages with the annular projection portion 5112 and the shaft portion 5113. The configurations of the annular projection portion 5112 and the shaft portion 5113 will be described in detail below.

The second side surface 512 includes a second erect portion 5121 that is erect from the second side surface 512 in the +Z direction, an annular projection portion 5122 that projects in the +Z direction, a first mounting portion 5123 that projects in the +Z direction and on which a first spring SP1 to be described below is mounted, a second mounting portion 5124 that projects in the +Z direction and on which a second spring SP2 to be described below is mounted, and a plate-shaped projection portion 5125 that projects in the +Z direction. Of these constituents, the second erect portion 5121 forms a part of the casing HU, as in the first erect portion 5111. The second erect portion 5121 is located between the driving unit 52 disposed on the second side surface 512 and the rotation adjustment unit 54. Further, to the second erect portion 5121, a projection portion 51211 that projects in the +X direction from a surface of the second erect portion 5121 in the +X direction is formed. The first spring SP1 to be described below comes into contact with the projection portion 51211.

The rotation adjustment unit 54 to be described below is inserted into the annular projection portion 5122.

The first opening 513 is an opening formed according to the first phase difference element 43 and is located in the +X direction of the first erect portion 5111. The first opening 513 has a circular shape with a diameter slightly smaller than the first phase difference element 43, and light via the afocal optical element 42 is incident on the first phase difference element 43 via the first opening 513.

The second opening 514 is an opening through which a shaft portion 5412 of a first gear 541 included in the rotation adjustment unit 54 is inserted, and the shaft portion 5412 is fitted in a through hole 5322 of the transmission gear 532 included in the transmission unit 53 via the second opening 514.

The third opening 515 is an opening through which a shaft portion 523 of the driving unit 52 is inserted, and a notch 5151 continuously extending from the third opening 515 is formed in the −X direction of the third opening 515. Therefore, when the shaft portion 523 of the driving unit 52 is slid in the −X direction along the notch 5151, the gear portion 522 of the driving unit 52 is disposed on the first side surface 511.

Configuration of Driving Unit

The driving unit 52 generates power to change a rotation angle of the first phase difference element 43 held in the rotation adjustment unit 54. The driving unit 52 is a motor that is configured as a stepping motor and is rotated according to a rotation amount according to the number of pulse signals input. As illustrated in FIG. 5, the driving unit 52 includes a body portion 521, a gear portion 522, and a shaft portion 523. When the shaft portion 523 extending in the −Z direction from the appropriately central position of the body portion 521 is rotated in a +S1 direction by driving of the body portion 521, the gear portion 522 fixed in the −Z direction of the shaft portion 523 is rotated in the +S1 direction.

The driving unit 52 is disposed on the second side surface 512 of the frame unit 51. The shaft portion 523 is mounted on the second side surface 512 when the notch 5151 is slid in the +X direction. As described above, the gear portion 522 fixed to the front end of the shaft portion 523 is disposed on the first side surface 511, as described above. Thus, when the gear portion 522 is rotated in the +S1 direction, the transmission unit 53 (a two-stage gear 531) meshing with the gear portion 522 is rotated in a −S1 direction.

Configuration of Transmission Unit

Figure 7:
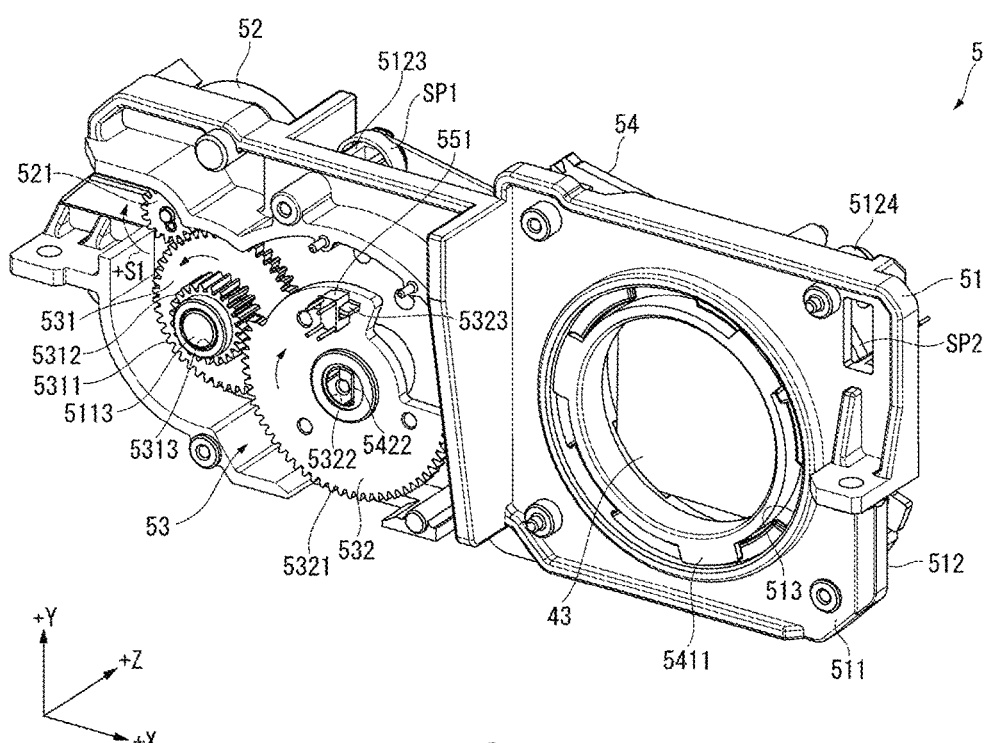
FIG. 7 is a perspective view illustrating the optical device from which cover units are detached when viewed from the light incidence side according to the embodiment.

FIG. 7 is a perspective view illustrating the optical device 5 from which the first cover unit 56 and the second cover unit 57 are detached when viewed from the −Z direction.

The transmission unit 53 is a member that transmits the power (power for adjusting a rotation angle of the first phase difference element 43 held in the rotation adjustment unit 54) of the driving unit 52 to the rotation adjustment unit 54. As illustrated in FIGS. 5 to 7, the transmission unit 53 includes the two-stage gear 531 and a transmission gear 532. Of these constituents, the two-stage gear 531 includes a first meshing portion 5311, a second meshing portion 5312, and a through hole 5313.

As illustrated in FIG. 7, the first meshing portion 5311 is a portion that meshes with the gear portion 522 of the driving unit 52. When the gear portion 522 is rotated in the +S1 direction, the first meshing portion 5311 is rotated in the −S direction by this rotation. The second meshing portion 5312 is installed in the appropriate center of the first meshing portion 5311 in the −Z direction.

The second meshing portion 5312 is formed in a columnar shape with a diameter smaller than the diameter of the first meshing portion 5311, and a meshing portion 5321 of the transmission gear 532 to be described below meshes with the second meshing portion 5312. The through hole 5313 is a hole through which the two-stage gear 531 is penetrated in the −Z direction and is installed in a middle portion of the first meshing portion 5311 and the second meshing portion 5312. The shaft portion 5113 in the first side surface 511 of the frame unit 51 is inserted into the through hole 5313. In this configuration, when the gear portion 522 of the driving unit 52 is rotated, the two-stage gear 531 is rotated about the shaft portion 5113 in tune with the rotation.

The transmission gear 532 is equivalent to a gear according to the invention and has a function of transmitting the power of the driving unit 52 to the rotation adjustment unit 54. As illustrated in FIG. 7, the transmission gear 532 is a portion that meshes with the second meshing portion 5312 of the two-stage gear 531. When the two-stage gear 531 is rotated in the −S1 direction, the transmission gear 532 is rotated in the +S direction by the rotation. The transmission gear 532 includes a meshing portion 5321, a through hole 5322, and a light-shielding portion 5323.

Of these constituents, the meshing portion 5321 meshes with the second meshing portion 5312 of the two-stage gear 531. The through hole 5322 is formed in the appropriate center of the transmission gear 532, and a shaft portion 5412 of the first gear 541 included in the rotation adjustment unit 54 to be described below is inserted into the through hole 5322 via the second opening 514. That is, the transmission gear 532 and the first gear 541 are supported concentrically by the frame unit 51.

The light-shielding portion 5323 is equivalent to an incidence suppression portion according to the invention, is disposed between a light emission unit 5511 and a light reception unit 5512 of a sensor 551 to be described below, and is moved between the light emission unit 5511 and the light reception unit 5512 in tune with the rotation of the transmission gear 532. The light-shielding portion 5323 is an arc-like member that protrudes in the −Z direction from the surface of the transmission gear 532 in the −Z direction.

Configuration of Rotation Adjustment Unit

Figure 8:
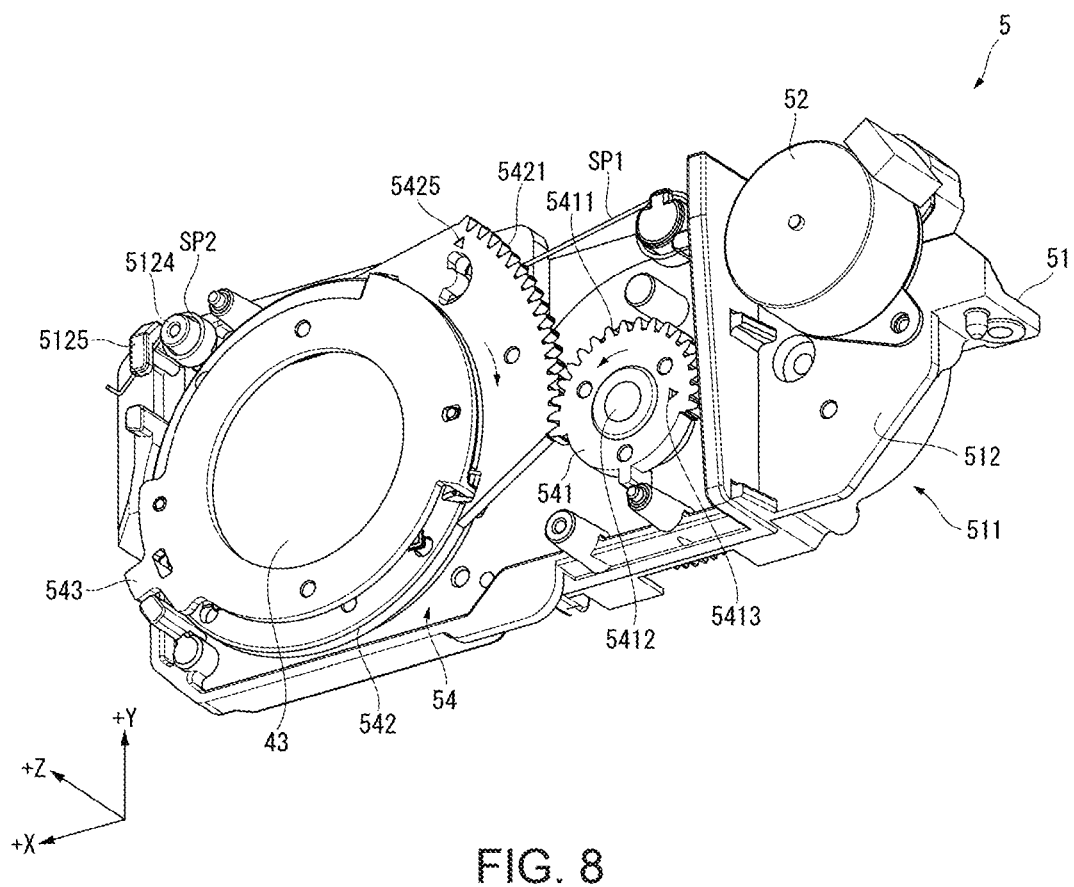
FIG. 8 is a perspective view illustrating the optical device from which the cover units are detached when viewed from the light exit side according to the embodiment.

FIG. 8 is a perspective view illustrating the optical device 5 from which the third cover unit 58 is detached when viewed in the +Z direction.

The rotation adjustment unit 54 is a member that holds the first phase difference element 43 and adjusts a rotation angle of the first phase difference element 43. The rotation adjustment unit 54 includes a first gear 541, a holder 542, and a holder cover 543. Of these constituents, the first gear 541 is a member that transmits the power from the transmission unit 53 to the holder 542.

The first gear 541 is a member that transmits the power from the transmission unit 53 (the transmission gear 532) to the holder 542. As illustrated in FIGS. 5 to 8, the first gear 541 includes a meshing portion 5411, a shaft portion 5412, and a marker 5413. Of these constituents, the meshing portion 5411 is a portion that meshes with the meshing portion 5421 of the holder 542 and is rotated in tune with the rotation of the shaft portion 5412. Specifically, as described above, the shaft portion 5412 is fitted in the through hole 5322 of the transmission gear 532 included in the transmission unit 53. For example, when the transmission gear 532 is rotated in the +S1 direction, the shaft portion 5412 is rotated in the +S1 direction. That is, the first gear 541 is rotated in the same direction as the rotation of the transmission gear 532.

The marker 5413 is a mark that is a marker when the first gear 541 is mounted on the second side surface 512. In a state in which the meshing portion 5411 of the first gear 541 and the meshing portion 5421 of the holder 542 mesh with each other at a position at which the marker 5425 of the holder 542 to be described below faces the marker 5413, the first gear 541 and the holder 542 are mounted on the second side surface 512.

The holder 542 and the holder cover 543 are equivalent to a holder according to the invention and are a member that holds the first phase difference element 43. Of these constituents, as illustrated in FIGS. 5 to 8, the holder 542 includes the meshing portion 5421, a projection opening 5422, an engagement portion 5423, a concave portion 5424, the marker 5425, and a projection portion 5426. Of these constituents, as illustrated in FIG. 8, the meshing portion 5421 meshes with the meshing portion 5411 of the first gear 541. Therefore, when the first gear 541 is rotated in the +S1 direction, the holder 542 is rotated in the −S1 direction.

The projection opening 5422 is formed in a appropriate center of the holder 542 and is an opening that includes a projection portion projecting in the −Z direction. The front end of the projection opening 5422 is fitted in the first opening 513 of the frame unit 51 and engages with the engagement portion 5131 formed in the first opening 513. Thus, the holder 542 is held to be rotatable in the second side surface 512 of the frame unit 51.

The engagement portion 5423 is configured to include a hole portion and a projection portion and is a portion that engages with the engagement portion 5432 of the holder cover 543. The engagement portion 5423 is formed at a position corresponding to the engagement portion 5432 on the surface of the holder 542 in the −Z direction. Thus, the holder cover 543 is fixed to the holder 542.

The concave portion 5424 is a portion that holds the first phase difference element 43. The concave portion 5424 is formed at a position facing the projection opening 5422 on the surface of the holder 542 in the +Z direction. The concave portion 5424 is formed in each of the four corners of the projection opening 5422 and holds each of the four corners of the first phase difference element 43. Thus, the first phase difference element 43 is fitted in the concave portion 5424 to be held.

The marker 5425 is a mark that is a marker when the holder 542 is mounted on the second side surface 512. In a state in which the meshing portion 5411 of the first gear 541 and the meshing portion 5421 of the holder 542 mesh with each other at a position at which the markers 5413 and 5425 of the first gear 541 face each other, the first gear 541 and the holder 542 are mounted on the second side surface 512.

The projection portion 5426 is formed on the surface of the holder 542 in the −Z direction and is a portion with which a portion of the first spring SP1 comes into contact. A stress by the first spring SP1 to be described below is applied to the projection portion 5426, and thus the projection portion 5426 is pressed toward the first gear 541.

The holder cover 543 is mounted on the surface of the holder 542 in the +Z direction and has a function of fixing the first phase difference element 43. The holder cover 543 includes an opening 5431 and an engagement portion 5432 that projects in the −Z direction. The opening 5431 is formed in a appropriate center of the holder cover 543 and is an opening that has appropriately the same as the diameter of the projection opening 5422 of the holder 542.

The engagement portion 5432 engages with three engagement portions 5423 of the holder 542 described above, and the holder 542 and the holder cover 543 are integrated. Thus, the surface of the holder cover 543 in the −Z direction comes into contact with the first phase difference element 43 fitted in the concave portion 5424 of the holder 542 so that the first phase difference element 43 is prevented from being dislocated from the holder 542.

Configuration of Spring

The first spring SP1 is equivalent to a first urging member according to the invention and urges the holder 542 toward the first gear 541. As illustrated in FIGS. 5, 6, and 8, the first spring SP1 includes a ring-shaped middle portion SP11, a contact portion SP12, and an urging portion SP13.

Of these constituents, the middle portion SP11 is mounted on the first mounting portion 5123 of the second side surface 512. The contact portion SP12 has a shape extending in the −Y direction from the position of the middle portion SP11 in the −X direction. The contact portion SP12 comes into contact with the projection portion 51211 of the second erect portion 5121.

Further, the urging portion SP13 has a shape extending in the +X direction from the position of the middle portion SP11 in the +Y direction. The urging portion SP13 is disposed at a position of the projection portion 5426 of the holder 542 in the +Y direction. That is, the first spring SP1 is formed in a appropriate L shape. The urging portion SP13 urges the projection portion 5426 of the holder 542 in the −Y direction, that is, toward the first gear 541.

The second spring SP2 is equivalent to a second urging member according to the invention and urges the holder 542 toward the central axis of the projection opening 5422 of the holder 542 (the rotation center of the holder 542). As illustrated in FIGS. 5, 6, and 8, the second spring SP2 includes a ring-shaped middle portion SP21, a contact portion SP22, and an urging portion SP23.

Of these constituents, the middle portion SP21 is mounted on the second mounting portion 5124 of the second side surface 512. The contact portion SP22 has a shape extending in the +X and −Y directions from the position of the middle portion SP21 in the −X direction. The contact portion SP22 comes into contact with a plate-shaped projection portion 5125.

Further, the urging portion SP23 has a shape extending in the −X direction from the position of the middle portion SP21 in the +Y direction. The urging portion SP23 comes into contact with the surface of the projection opening 5422 of the holder 542 in the +X direction. That is, the second spring SP2 is formed in a appropriate V shape. The urging portion SP23 urges the projection opening 5422 of the holder 542 in the −X direction, that is, toward the rotation center of the holder 542.

Configuration of Sensor Unit

Figure 9:
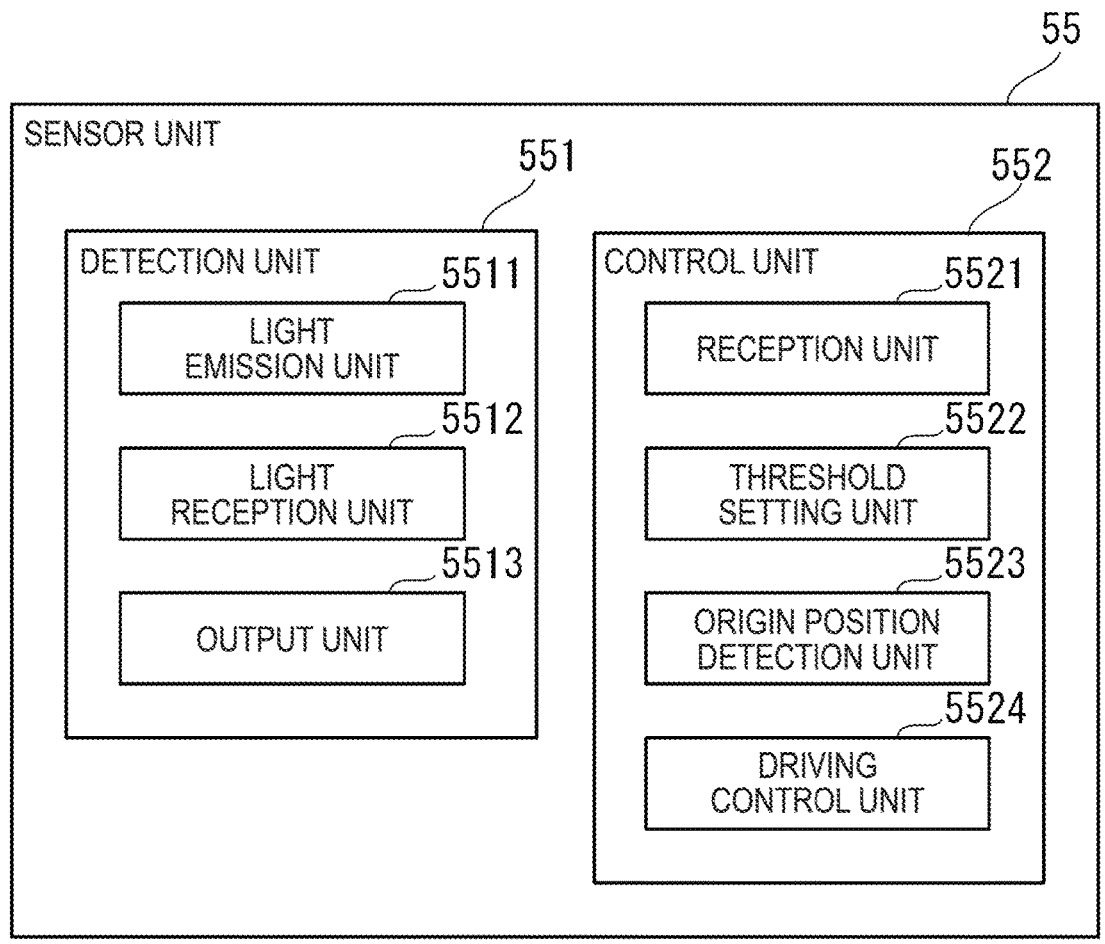
FIG. 9 is a block diagram illustrating the configuration of a sensor unit according to the embodiment.

FIG. 9 is a block diagram illustrating the configuration of the sensor unit 55.

The sensor unit 55 detects a rotation angle of the first phase difference element 43 held by the rotation adjustment unit 54 and controls the driving unit 52. The sensor unit 55 is fixed to the first cover unit 56 to be described below. As illustrated in FIG. 9, the sensor unit 55 includes the sensor 551 and a control unit 552.

The sensor 551, the control unit 552, the transmission gear 532, and the driving unit 52 configure a position detection device according to the invention.

Of these constituents, the sensor 551 is configured with a photosensor and includes the light emission unit 5511, the light reception unit 5512, and an output unit 5513. The sensor 551 is disposed at a position facing the transmission gear 532.

The light emission unit 5511 is configured with an LED or the like and emits light toward the light reception unit 5512. The light reception unit 5512 receives the light emitted from the light emission unit 5511. The light-shielding portion 5323 of the transmission gear 532 is inserted into or extracted from between the light emission unit 5511 and the light reception unit 5512. Thus, when the transmission gear 532 is rotated in the +S1 direction or the −S1 direction, the light-shielding portion 5323 is rotated in this direction. Then, the amount of light emitted from the light emission unit 5511 and received by the light reception unit 5512 is changed.

The light reception unit 5512 detects an amount of received light incident on the light reception unit 5512. The output unit 5513 outputs (transmits) the amount of light received (detected) by the light reception unit 5512 to the control unit 552.

The control unit 552 adjusts an origin position of the transmission gear 532 and adjusts a rotation angle of the first phase difference element 43 based on the amount of light received by the light reception unit 5512 and detected by the sensor 551. As illustrated in FIG. 9, the control unit 552 includes a reception unit 5521, a threshold setting unit 5522, an origin position detection unit 5523, and a driving control unit 5524.

The reception unit 5521 acquires an amount of light transmitted from the sensor 551 and received by the light reception unit 5512.

The threshold setting unit 5522 sets a detection threshold of the light in the light reception unit 5512 based on the amount of light received by the reception unit 5521. Specifically, the threshold setting unit 5522 sets a detection threshold of light incident on the light reception unit 5512 to a predetermined value which is less than a value of a first light reception amount at the time of incidence of appropriately all the light emitted from the light emission unit 5511 on the light reception unit 5512 and is greater than a value of a second light reception amount at the time of suppression of the incidence of appropriately all the light emitted from the light emission unit 5511 on the light reception unit 5512 by the light-shielding portion 5323. Hereinafter, a detection threshold setting process performed by the threshold setting unit 5522 will be described.

Detection Threshold Setting Process

Figure 10:
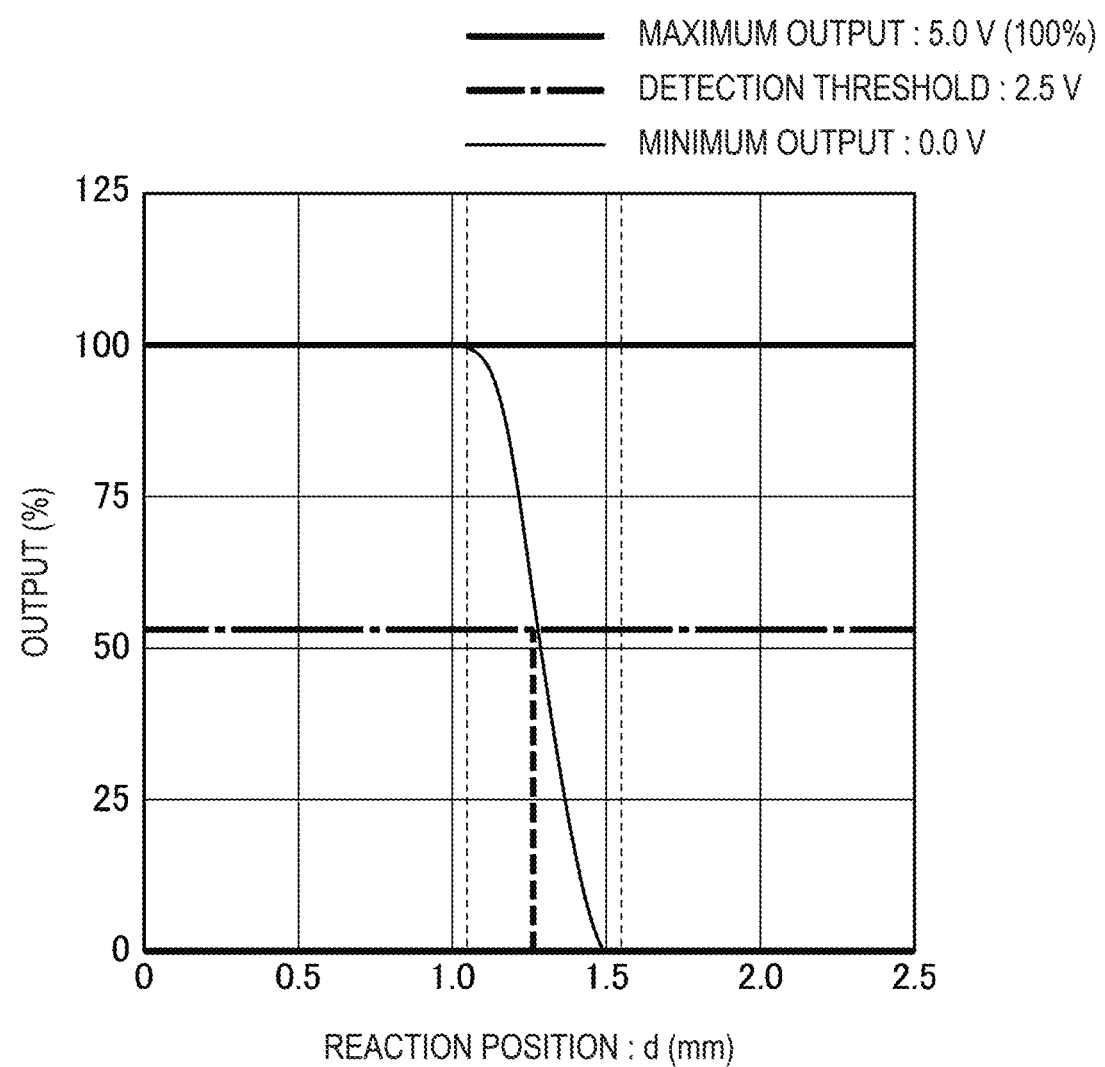
FIG. 10 is a graph illustrating an example in which a detection threshold is set according to the embodiment.

FIG. 10 is a graph illustrating a detection threshold and a value (output value) of the amount of light received by the light reception unit 5512 in a case in which the light emission unit 5511 and the light reception unit 5512 do not degrade. In the graph, the horizontal axis represents a distance d (mm) from an end of the sensor 551 in the −X direction to the light emission unit 5511 and the light reception unit 5512 and the vertical axis represents an output (%) output from the output unit 5513.

For example, the threshold setting unit 5522 sets the detection threshold to a ½ value of a value obtained by subtracting the second light reception amount from the first light reception amount, as illustrated in FIG. 10, in a case in which the light emission unit 5511 and the light reception unit 5512 do not degrade.

For example, when the light reception unit 5512 receives the amount of light received by the light reception unit 5512 at the time of incidence of appropriately all the light emitted from the light emission unit 5511 (the first light reception amount), a value (V) output from the output unit 5513 is 5.0 V, as illustrated in FIG. 10. When the light reception unit 5512 receives the amount of light received by the light reception unit 5512 at the time of shielding of appropriately all the light emitted from the light emission unit 5511 by the light-shielding portion 5323 (the second light reception amount), a value (V) output from the output unit 5513 is 0.0 V, as illustrated in FIG. 10. Therefore, the threshold setting unit 5522 sets the detection threshold to 2.5 V which is ½ of the first light reception amount (5.0 V)—the second light reception amount (0.0 V).

Figure 11:
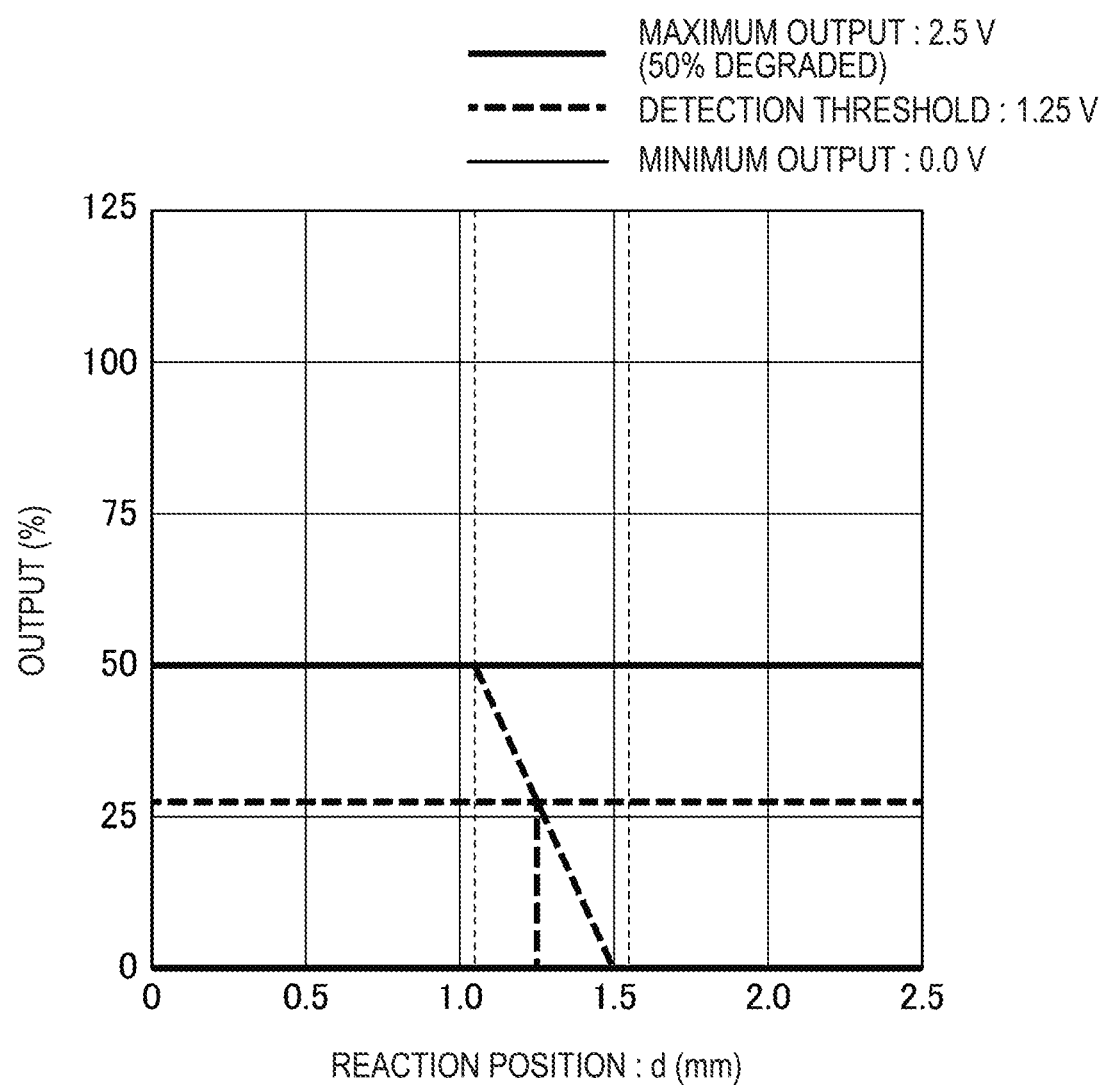
FIG. 11 is a graph illustrating an example in which a detection threshold is set in a case in which at least parts of a light reception unit and a detection unit degrade according to the embodiment.

FIG. 11 is a graph illustrating a detection threshold and a value (output value) of the amount of light received by the light reception unit 5512 in a case in which the light emission unit 5511 and the light reception unit 5512 degrade.

For example, when the light reception unit 5512 receives the amount of light received by the light reception unit 5512 at the time of incidence of appropriately all the light emitted from the light emission unit 5511 (the first light reception amount), a value (V) output from the output unit 5513 is 2.5 V, as illustrated in FIG. 11. When the light reception unit 5512 receives the amount of light received by the light reception unit 5512 at the time of shielding of appropriately all the light emitted from the light emission unit 5511 by the light-shielding portion 5323 (the second light reception amount), a value (V) output from the output unit 5513 is 0.0 V, as illustrated in FIG. 11. Therefore, the threshold setting unit 5522 sets the detection threshold to 1.25 V which is ½ of the first light reception amount (2.5 V)—the second light reception amount (0.0 V).

The detection threshold setting process by the threshold setting unit 5522 is performed whenever the power device (not illustrated) is turned on. Then, the detection threshold is set every time.

That is, in the embodiment, even in a case in which the light emission unit 5511 and the light reception unit 5512 degrade and the amount of light received by the light reception unit 5512 is reduced, the detection threshold matching the degree of degradation of the light emission unit 5511 and the light reception unit 5512 is set by the threshold setting unit 5522.

Referring back to FIG. 9, the origin position detection unit 5523 of the control unit 552 is equivalent to a position detection unit according to the invention and performs origin position adjustment of the transmission gear 532 based on the light reception amount and the detection threshold. For example, the origin position detection unit 5523 performs a process in the following procedure.

First, the origin position detection unit 5523 performs the origin position adjustment of the transmission gear 532 based on the detection threshold and the amount of light received by the light reception unit 5512 after the threshold setting unit 5522 sets the detection threshold. Specifically, the origin position detection unit 5523 causes the driving control unit 5524 to be described below to control the driving unit 52 to determine whether the light reception amount (V) exceeds the detection threshold, and then detects the origin position of the transmission gear 532 and moves the transmission gear 532 to the origin position. Thus, the transmission unit 53 and the rotation adjustment unit 54 are in the state illustrated in FIGS. 7 and 8.

Rotation Angle Adjustment of First Phase Difference Element

The driving control unit 5524 has a function of controlling the driving of the driving unit 52.

When the origin position is detected, the control unit 552 adjusts a ratio between the S-polarized light and the P-polarized light of the excited light transmitted through the first phase difference element 43 according to a rotation amount (a rotation angle) of the first phase difference element 43. Specifically, the control unit 552 adjusts a ratio between an S-polarized component and a P-polarized component of the excited light emitted from the first phase difference element 43 so that exit efficiency of the light emitted from the illumination device 31 is highest.

First, when the driving control unit 5524 of the control unit 552 transmits a pulse signal (driving signal) to the driving unit 52, the driving unit 52 is driven and the gear portion 522 is rotated in the +S1 direction. Since the gear portion 522 meshes with the first meshing portion 5311 of the two-stage gear 531 of the transmission unit 53, the two-stage gear 531 is rotated in the −S1 direction. The second meshing portion 5312 of the two-stage gear 531 meshes with the meshing portion 5321 of the transmission gear 532. Therefore, when the two-stage gear 531 is rotated in the −S1 direction, the transmission gear 532 is rotated in the +S1 direction. Since the transmission gear 532 has the same shaft as the first gear 541 of the rotation adjustment unit 54, the first gear 541 is rotated in the same direction (the +S1 direction) as the transmission gear 532. Thus, since the first gear 541 meshes with the meshing portion 5421 of the holder 542, the holder 542 is rotated in the −S1 direction. In this way, when the holder 542 is rotated, the first phase difference element 43 held in the holder 542 is rotated in the same direction. In this way, a rotation angle of the first phase difference element 43 is adjusted, and thus the ratio between the P-polarized component and the S-polarized component of the light emitted via the first phase difference element 43 is adjusted.

In a case in which the gear portion 522 of the driving unit 52 is rotated in the −S1 direction through the control of the driving control unit 5524, the foregoing gears are rotated in the opposite direction to the foregoing direction, the first phase difference element 43 is rotated in the direction, and thus the rotation angle is adjusted.

Configuration of Cover Unit

As illustrated in FIGS. 5 and 6, the first cover unit 56 is a member that is disposed at a position facing the transmission unit 53 on the first side surface 511 of the frame unit 51 and covers the transmission unit 53. A appropriately rectangular opening 561 is formed in the first cover unit 56, and the sensor 551 of the sensor unit 55 is inserted into the opening 561. Thus, the sensor 551 is disposed near the light-shielding portion 5323 of the transmission gear 532 of the transmission unit 53 with the first cover unit 56 interposed therebetween.

The second cover unit 57 is a rectangular plate-like member that is disposed at a position facing the first opening 513 in the first side surface 511 of the frame unit 51. An opening 571 is formed in a appropriate center of the second cover unit 57. The opening 571 is formed in a circular shape with a diameter slightly smaller than the first opening 513. Light via the light source unit 41 and the afocal optical element 42 is incident on the first phase difference element 43 via the opening 571.

As illustrated in FIGS. 5 and 6, the third cover unit 58 is disposed at a position facing the rotation adjustment unit 54 on the second side surface 512 of the frame unit 51. An opening 581 is formed in the third cover unit 58. The opening 581 is formed in a circular shape with a diameter slightly smaller than the first opening 513. Light of which a polarization direction is converted by the first phase difference element 43 is emitted toward the homogenizer optical element 44 via the opening 5431 and the opening 581.

Configuration of Casing

Figure 12:
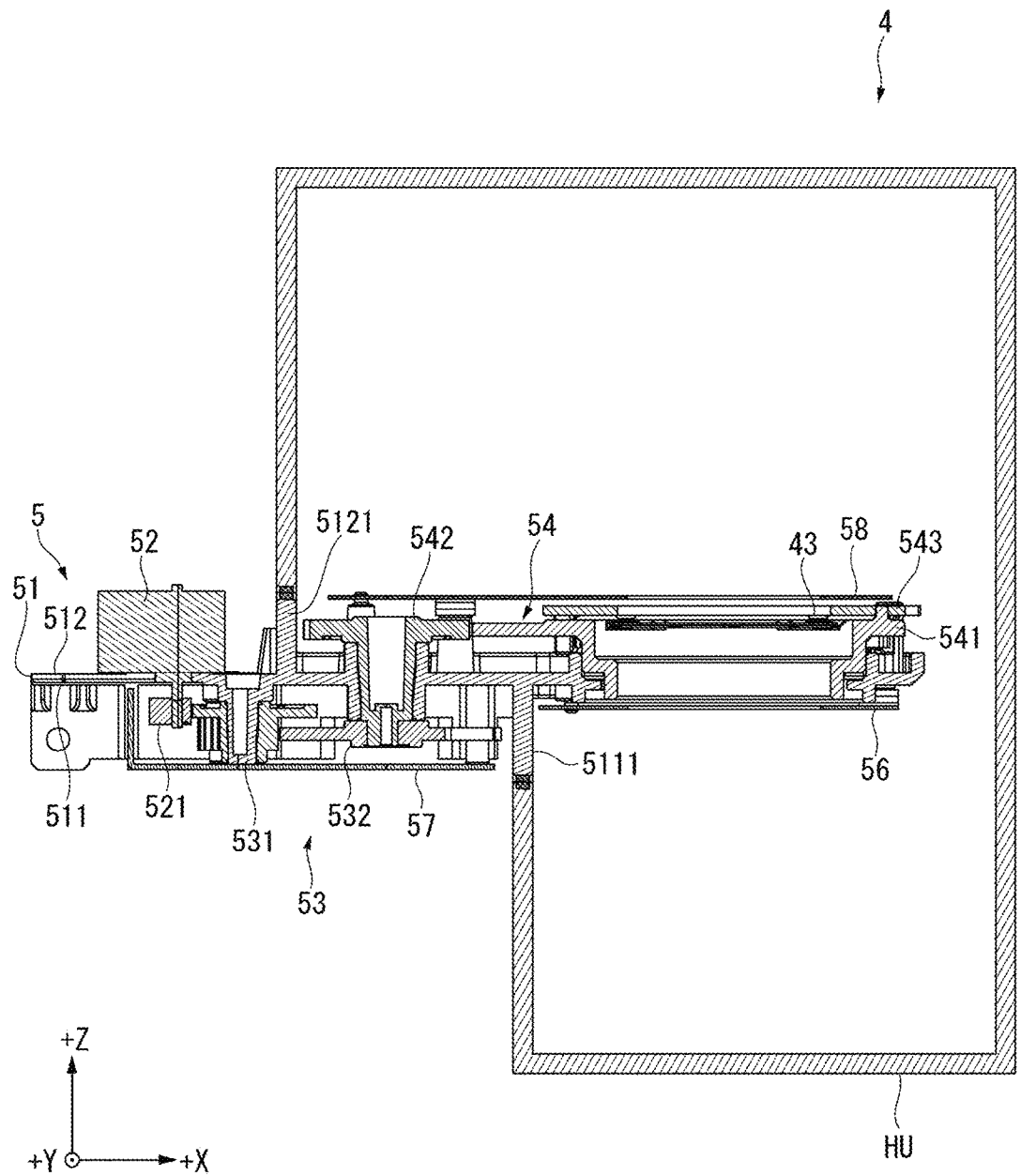
FIG. 12 is a sectional view illustrating a light source device according to the embodiment.

FIG. 12 is a sectional view illustrating the light source device 4. In FIG. 12, the configuration except for the optical device 5 is not illustrated to facilitate the description.

As illustrated in FIG. 12, the casing HU accommodates various devices (various elements) 41 to 49 and 4A, and a part of the optical device 5. The casing HU is a sealed casing. A circulation cooling device (not illustrated) is disposed inside the casing HU. In the embodiment, the circulation cooling device is configured to be disposed inside the casing HU, but the invention is not limited thereto. No circulation cooling device may be disposed.

A part of the frame unit 51 of the optical device 5 configures a part of the casing HU. Specifically, the first erect portion 5111 and the second erect portion 5121 form a part of the casing HU, and a part of the optical device 5 is accommodated inside the casing HU.

Specifically, the rotation adjustment unit 54, the first cover unit 56, and the third cover unit 58 included in the optical device 5 are accommodated inside the casing HU. The driving unit 52, the transmission unit 53, the sensor unit 55, and the second cover unit 57 are disposed out of the casing HU.

Advantages of Embodiment

The projector 1 according to the above-described embodiment has the following advantages.

The threshold setting unit 5522 sets the detection threshold to the value which is less than the first light reception amount received by the light reception unit 5512 and is greater than the second light reception amount. Therefore, for example, compared to the position detection device in which the detection threshold is set in advance, an appropriate detection threshold can be set even in a case in which at least one of the light emission unit 5511 and the light reception unit 5512 degrades. Accordingly, it is possible to accurately detect the origin position of the transmission gear 532 or the like.

The threshold setting unit 5522 sets the detection threshold to the value of ½ of the value obtained by subtracting the second light reception amount from the first light reception amount. Therefore, it is possible to reliably determine whether the light emitted from the light emission unit 5511 to the light reception unit 5512 is incident. Accordingly, it is possible to more accurately detect the origin position of the transmission gear 532 or the like.

According to the first aspect, whenever the power device is turned on, the detection threshold is set by the threshold setting unit 5522. Therefore, the detection threshold matching the degree of degradation of the light emission unit 5511 and the light reception unit 5512 can be set every time. Accordingly, the origin position can be detected very accurately by the origin position detection unit 5523.

By adjusting the origin position of the transmission gear 532 included in the transmission unit 53, it is possible to adjust the origin position of the rotation angle of the first phase difference element 43. Thus, it is possible to adjust the rotation angle of the first phase difference element 43 to a desired angle. Accordingly, it is possible to accurately adjust a ratio between polarized components of the light passing through the first phase difference element 43 to a desired ratio.

Further, by accurately adjusting a rotation angle of the first phase difference element 43 held in the optical device 5 disposed between the light source unit 41 and the wavelength conversion device 47, it is possible to accurately adjust a ratio of the fluorescent light to the excited light (blue light) combined by the light separation element 45. Accordingly, it is possible to exit desired light (illumination light) from the light source device 4.

Further, since the desired illumination light is projected from the light source device 4, it is possible to improve luminance and saturation of a projected image projected from the projector 1.

Since the rotation adjustment unit 54 that adjusts the rotation angle of the first phase difference element 43 and the transmission unit 53 that transmits the power used for the rotation adjustment unit 54 to adjust the rotation angle to the rotation adjustment unit 54 are disposed with the frame unit 51 interposed therebetween, it is possible to reduce a possibility that dust (for example, grease) attached to at least the transmission unit 53 is attached to the first phase difference element 43. Accordingly, it is possible to improve dust resistance of the optical device 5.

Since the first erect portion 5111 and the second erect portion 5121 erect from the first side surface 511 and the second side surface 512 of the frame unit 51 respectively, the first side surface 511 can be divided into two regions by the first erect portion 5111 and the second side surface 512 can be divided into two regions by the second erect portion 5121. Accordingly, the rotation adjustment unit 54 disposed in one region of the two regions of the second side surface 512 divided by the second erect portion 5121 can be prevented from being affected by members or the like disposed in the other region.

The driving unit 52 is disposed on the second side surface 512. Therefore, for example, it is possible to reduce the thickness dimension of the optical device 5 more than in a case in which the driving unit 52 is disposed on the first side surface 511.

Since the second erect portion 5121 is erect between the rotation adjustment unit 54 and the driving unit 52 on the second side surface 512, the driving unit 52 and the rotation adjustment unit 54 can be divided by the second erect portion 5121. Further, since the first erect portion 5111 is erect between the first opening 513 and the transmission unit 53 on the first side surface 511, dust attached to the transmission unit 53 can be prevented from being splashed to the first opening 513. Further, dust can be prevented from being attached to the first phase difference element 43 via the first opening 513.

For example, in a case in which temperature of the rotation adjustment unit 54 increases due to light or the like incident on the first phase difference element 43, the holder 542 and the first gear 541 included in the rotation adjustment unit 54 are considered to be deformed. In contrast, according to the first aspect, the first spring SP1 urges the holder 542 toward the first gear 541 and the second spring SP2 urges the holder 542 toward the rotation center of the holder 542. Therefore, even in a case in which the holder 542 and the first gear 541 are slightly deformed, the holder 542 can reliably be rotated in tune with the rotation of the first gear 541. Accordingly, it is possible to reliably adjust the rotation angle of the first phase difference element 43 held in the holder 542.

The sensor unit 55 (the sensor 551 and the control unit 552) disposed on the first side surface 511 can detect a rotation angle of the first phase difference element 43. Since the origin position is adjusted by the sensor unit 55 and the rotation angle can subsequently adjusted, it is possible to reliably adjust a rotation angle of the first phase difference element 43.

Here, the rotation adjustment unit 54 is disposed inside the casing HU included in the light source device 4. In this case, when the sensor unit 55 is disposed on the side of the rotation adjustment unit 54, that is, the second side surface 512, and the sensor unit 55 is also disposed inside the casing HU, there is a concern of the sensor unit 55 being damaged at the time of increase in temperature inside the casing HU.

In contrast, in the embodiment, the sensor unit 55 is disposed on the first side surface 511. Therefore, even in a case in which the rotation adjustment unit 54 is disposed inside the casing HU, it is possible to prevent the sensor unit 55 from being damaged.

Since at least parts of the light source unit 41 and the optical device 5 are accommodated inside the casing HU, it is possible to prevent dust from being attached to parts of the light source unit 41 and the optical device 5 disposed inside the casing HU. Accordingly, it is possible to improve dust resistance of the optical device 5. Further, it is possible to improve dust resistance of the light source device 4.

Since the first erect portion 5111 and the second erect portion 5121 of the optical device 5 form parts of the casing HU, a part of the optical device 5 can easily be accommodated inside the casing HU.

Since the rotation adjustment unit 54 is accommodated inside the casing HU and the transmission unit 53 is disposed out of the casing HU, it is possible to reliably prevent dust such as grease attached to the transmission unit 53 from being attached to the rotation adjustment unit 54 and further from being attached to the first phase difference element 43 held in the rotation adjustment unit 54. Since the sensor unit 55 and the driving unit 52 are disposed out of the casing HU, it is possible to prevent the sensor unit 55 and the driving unit 52 from being damaged due to an increase in the temperature inside the casing HU.

Further, since it is possible to considerably reduce the possibility of dust being attached to the first phase difference element 43, it is possible to prevent the amount of light emitted via the first phase difference element 43 from being reduced.

It is possible to prevent the amount of light emitted from the light source device 4 from being reduced, and thus desired illumination light can be exited from the illumination device 31. Therefore, it is possible to prevent luminance and saturation of a projected image projected from the projector 1 from being reduced.

Modifications of Embodiment

The invention is not limited to the foregoing embodiment but modifications, improvements, and the like are included in the invention within the scope of the invention in which the goals of the invention can be achieved.

In the foregoing embodiment, the threshold setting unit 5522 is configured to set the detection threshold to the value of ½ of the value obtained by subtracting the second light reception amount at the time of suppression of the incidence of appropriately all the light emitted from the light emission unit 5511 on the light reception unit 5512 by the light-shielding portion 5323 from the first light reception amount at the time of incidence of appropriately all the light emitted from the light emission unit 5511 on the light reception unit 5512. However, the invention is not limited thereto. For example, the threshold setting unit 5522 may set the detection threshold to ⅓ of the value obtained by subtracting the second light reception amount from the first light reception amount or may set the detection threshold to ⅕ of the foregoing value. That is, when a value is less than the value of the first light reception amount and is greater than the value of the second light reception amount, any value may be set or a value multiplied by a predetermined ratio less than "1" may be set.

In the foregoing embodiment, the threshold setting unit 5522 is configured to set the detection threshold whenever the power device (not illustrated) is turned on. However, the invention is not limited thereto. For example, the control unit 552 may include a timer and the threshold setting unit 5522 may set the detection threshold whenever a predetermined time elapses. Even in this case, it is possible to obtain the same advantages as those of the foregoing embodiment.

In the foregoing embodiment, the threshold setting unit 5522 is configured to set the detection threshold based on the amount of light received by the light reception unit 5512. However, the invention is not limited thereto. For example, the threshold setting unit 5522 may set the detection threshold based on the amount of light emitted from the output unit 5513.

In the foregoing embodiment, the sensor 551 is configured to include the light emission unit 5511 and the light reception unit 5512 disposed to face each other. However, the invention is not limited thereto. For example, the light emission unit 5511 and the light reception unit 5512 may be disposed in parallel to face in the same direction. In this case, the light emitted from the light emission unit 5511 may be reflected to the light-shielding portion 5323 and may be incident on the light reception unit 5512. Even in this case, it is possible to obtain the same advantages as those of the foregoing embodiment.

In the foregoing embodiment, the sensor unit 55 is configured to be included as the detection unit. However, the invention is not limited thereto. For example, the sensor unit 55 may not be included.

The sensor unit 55 is configured to be disposed on the first side surface 511, that is, at the position facing the transmission gear 532 included in the transmission unit 53. However, the invention is not limited thereto. For example, the sensor unit 55 may be installed at a position facing the two-stage gear 531 or may be installed at a position facing the first gear 541 on the second side surface 512. In this case, the light-shielding portion 5323 may be installed in the gear disposed to face the sensor unit 55. Accordingly, it is possible to obtain the same advantages as those of the foregoing embodiment.

In the foregoing embodiment, the frame unit 51 is configured to include the first erect portion 5111 and the second erect portion 5121. However, the invention is not limited thereto. For example, the frame unit 51 may not include the first erect portion 5111 and the second erect portion 5121. Even in this case, since the transmission unit 53 and the rotation adjustment unit 54 are disposed with the frame unit 51 interposed therebetween, it is possible to obtain the same advantages as those of the foregoing embodiment.

In the foregoing embodiment, the first erect portion 5111 is configured to be erect between the first opening 513 and the transmission unit 53 and the second erect portion 5121 is configured to erect between the driving unit 52 and the rotation adjustment unit 54. However, the invention is not limited thereto. For example, the first erect portion 5111 and the second erect portion 5121 may be disposed at different positions.

In the foregoing embodiment, the optical device 5 is configured to include the driving unit 52. However, the invention is not limited thereto. For example, the optical device 5 may not include the driving unit 52. In this case, for example, a configuration may be realized to transmit power used to drive the rotation adjustment unit 54 to the transmission unit 53 and this configuration may be achieved by a user manipulation or the like. Even in this case, it is possible to obtain the same advantages as those of the foregoing embodiment.

In the foregoing embodiment, the rotation adjustment unit 54 is configured to include the first gear 541, the holder 542, and the holder cover 543. However, the invention is not limited thereto. For example, a gear may be installed between the first gear 541 and the holder 542. In this case, the holder 542 can be moved in an opposite direction to the direction of the foregoing embodiment. The holder cover 543 is configured to be included. However, the holder cover 543 may not be included. In this case, the holder 542 may include a fixing portion that fixes the first phase difference element 43.

In the foregoing embodiment, the first spring SP1 and the second spring SP2 are configured to be included. However, the invention is not limited thereto. For example, one of the first spring SP1 and the second spring SP2 may not be included and neither of these springs may be included. In this case, for example, a heat sink or the like transmitting heat inside the casing HU to the outside of the casing HU may be installed in addition to the circulation cooling device suppressing an increase in temperature inside the casing HU. Accordingly, it is possible to reduce a possibility that the rotation adjustment unit 54 disposed inside the casing HU is distorted. Therefore, even when neither the first spring SP1 nor the second spring SP2 is included, it is possible to obtain the same advantages as those of the foregoing embodiment.

In the foregoing embodiment, the light source device 4 is configured to include the casing HU. However, the invention is not limited thereto. For example, the light source device 4 may not include the casing HU.

In the foregoing embodiment, the rotation adjustment unit 54 is configured to be disposed inside the casing HU and the transmission unit 53 is configured to be disposed out of the casing HU. However, the invention is not limited thereto. For example, the transmission unit 53 may be disposed inside the casing and the rotation adjustment unit 54 may be disposed inside the casing HU.

In the foregoing embodiment, the light modulation devices 34 (34R, 34G, and 34B) are configured to be used. However, the invention is not limited thereto. For example, instead of transmissive light modulation devices 34 (34R, 34G, and 34B), reflective light modulation devices may be used. In this case, the color combination device 35 may perform color separation and color combination without including the color separation device 32.

In the foregoing embodiment, the projector 1 is configured to include the three light modulation devices 34 (34R, 34G, and 34B), but the invention is not limited thereto. That is, the invention can also be applied to a projector using two or less or four or more light modulation devices.

A light modulation device, such as a device using a micromirror, for example, a device using a digital micromirror device (DMD) or the like, other than a liquid crystal device may be used as long as the device is a light modulation device capable of modulating an incident light flux and forming an image according to image information.

What is claimed is:

1. A position detection device comprising:
   a sensor that includes a light emission unit and a light reception unit receiving light emitted from the light emission unit;
   a driving unit;
   a gear that is disposed at a position facing the sensor and is rotated by power from the driving unit; and
   a control unit that drives the driving unit based on an amount of light received by the light reception unit and detected by the sensor,
   wherein the gear includes an incidence suppression portion suppressing incidence of at least a part of the light emitted from the light emission unit on the light reception unit according to rotation of the gear, and
   wherein the control unit includes
      a threshold setting unit that sets a detection threshold of the light in the light reception unit to a predetermined value which is less than a value of a first light reception amount at the time of incidence of appropriately all the light on the light reception unit and is greater than a value of a second light reception amount at the time of suppressing of appropriately all the light by the incidence suppression portion, and
      a position detection unit that detects a position of the gear after the threshold setting unit sets the detection threshold.

2. The position detection device according to claim 1, wherein the threshold setting unit sets the detection threshold to a value of ½ of a value obtained by subtracting the second light reception amount from the first light reception amount.

3. The position detection device according to claim 1, further comprising:
   a power device that supplies power to the control unit, wherein the threshold setting unit sets the detection threshold whenever the power device is turned on.

4. An optical device comprising:
   the position detection device according to claim 1;
   an optical element that converts a polarization direction of light incident according to a rotation angle;
   a rotation adjustment unit that holds the optical element and adjusts the rotation angle of the optical element;
   a transmission unit that transmits power used for the rotation adjustment unit to adjust the rotation angle to the rotation adjustment unit; and
   a frame unit that holds the rotation adjustment unit and the transmission unit,
   wherein the rotation adjustment unit and the transmission unit are disposed so that the frame unit is interposed between the rotation adjustment unit and the transmission unit, and
   wherein the transmission unit includes the gear.

5. An optical device comprising:
   the position detection device according to claim 2;
   an optical element that converts a polarization direction of light incident according to a rotation angle;
   a rotation adjustment unit that holds the optical element and adjusts the rotation angle of the optical element;
   a transmission unit that transmits power used for the rotation adjustment unit to adjust the rotation angle to the rotation adjustment unit; and
   a frame unit that holds the rotation adjustment unit and the transmission unit,
   wherein the rotation adjustment unit and the transmission unit are disposed so that the frame unit is interposed between the rotation adjustment unit and the transmission unit, and
   wherein the transmission unit includes the gear.

6. An optical device comprising:
   the position detection device according to claim 3;
   an optical element that converts a polarization direction of light incident according to a rotation angle;
   a rotation adjustment unit that holds the optical element and adjusts the rotation angle of the optical element;
   a transmission unit that transmits power used for the rotation adjustment unit to adjust the rotation angle to the rotation adjustment unit; and
   a frame unit that holds the rotation adjustment unit and the transmission unit,
   wherein the rotation adjustment unit and the transmission unit are disposed so that the frame unit is interposed between the rotation adjustment unit and the transmission unit, and
   wherein the transmission unit includes the gear.

7. A light source device comprising:
   an excited light source that exits excited light;
   a wavelength conversion device that converts a part of the excited light emitted from the excited light source into fluorescent light;
   a light combination device that combines another part of the excited light with the fluorescent light and emits the combined light; and
   the optical device according to claim 4 that is disposed between the excited light source and the wavelength conversion device.

8. A projector comprising:
   the light source device according to claim 7;
   a light modulation device that modulates light emitted from the light source device; and
   a projection optical device that projects the light modulated by the light modulation device.

* * * * *